United States Patent
Peterson et al.

(10) Patent No.: US 7,197,466 B1
(45) Date of Patent: Mar. 27, 2007

(54) WEB-BASED SYSTEM FOR MANAGING SOFTWARE ASSETS

(75) Inventors: Charlotte G. Peterson, Darien, CT (US); Sada Reddy, Suffern, NY (US); Lisa Demko, Stamford, CT (US); Jeannie Pumphrey, Woodbury, CT (US); Douglas R. Kornish, Cincinnati, OH (US); Harsha Hatti, Pasadena, CA (US); Kim Giancaspro, Norwalk, CT (US); Christopher L. Stanard, Niskayuna, NY (US)

(73) Assignee: General Electric Capital Corporation, Stamford, CT (US)

( * ) Notice: Subject to any disclaimer, the term of this patent is extended or adjusted under 35 U.S.C. 154(b) by 674 days.

(21) Appl. No.: 09/705,110

(22) Filed: Nov. 2, 2000

(51) Int. Cl.
*G06Q 99/00* (2006.01)
*G06F 17/30* (2006.01)

(52) U.S. Cl. ..................... 705/1; 707/104.1

(58) Field of Classification Search ............ 705/1, 705/8, 26, 400, 59, 56, 80; 707/104.1; 717/170, 717/177, 174, 168; 713/155, 202, 201, 200
See application file for complete search history.

(56) References Cited

U.S. PATENT DOCUMENTS

| | | | |
|---|---|---|---|
| 4,924,378 A | 5/1990 | Hershey et al. | |
| 4,937,863 A | 6/1990 | Robert et al. | |
| 5,361,355 A | 11/1994 | Kondo et al. | |
| 5,438,508 A | 8/1995 | Wyman | |
| 5,553,143 A * | 9/1996 | Ross et al. ............ | 705/59 |
| 5,579,222 A | 11/1996 | Bains et al. | |
| 5,671,412 A | 9/1997 | Christiano | |
| 5,673,315 A | 9/1997 | Wolf | |
| 5,742,757 A | 4/1998 | Hamadani et al. | |
| 5,745,879 A | 4/1998 | Wyman | |
| 5,754,763 A | 5/1998 | Bereiter | |
| 5,758,068 A | 5/1998 | Brandt et al. | |
| 5,765,138 A * | 6/1998 | Aycock et al. ............ | 705/7 |
| 5,778,368 A | 7/1998 | Hogan et al. | |
| 5,788,504 A * | 8/1998 | Rice et al. ............ | 434/219 |
| 5,790,664 A | 8/1998 | Coley et al. | |
| 5,805,699 A | 9/1998 | Akiyama et al. | |
| 5,845,065 A * | 12/1998 | Conte et al. ............ | 713/200 |
| 5,935,243 A | 8/1999 | Hasebe et al. | |

(Continued)

FOREIGN PATENT DOCUMENTS

EP 0667 572 A1 * 8/1995
WO WO 99/63705 * 12/1999

OTHER PUBLICATIONS

North Plains Systems; Digital Asset Management; the Internet print out of http://www.northplains.com.*

*Primary Examiner*—Igor N. Borissov
(74) *Attorney, Agent, or Firm*—Armstrong Teasdale LLP

(57) ABSTRACT

The disclosed invention is a software license management system (SLMS) utilizing a web-based interactive database to automate a software management process (SWMP) for managing software assets, measuring compliance requirements, and tracking/reporting status as necessary to assure proficiency and adherence to implementation requirements of the software management process. The SWMP is a process consisting of five different phases. The five steps of the SWMP involve identification of various solution alternatives, acquisition, deployment, maintenance and software retirement. The SWMP establishes high-level software management process to avoid litigation and penalties, maximize software asset utilization through tighter inventory control, and capitalize on the software procurement process.

113 Claims, 16 Drawing Sheets

U.S. PATENT DOCUMENTS

| | | |
|---|---|---|
| 6,023,766 A | 2/2000 | Yamamura |
| 6,029,145 A | 2/2000 | Barritz et al. |
| 6,044,471 A * | 3/2000 | Colvin ................ 713/202 |
| 6,081,518 A | 6/2000 | Bowman-Amuah |
| 6,144,945 A * | 11/2000 | Garg et al. ............ 705/28 |
| 6,147,975 A | 11/2000 | Bowman-Amuah |
| 6,188,995 B1 | 2/2001 | Garst et al. |
| 6,195,697 B1 | 2/2001 | Bowman-Amuah |
| 6,202,207 B1 | 3/2001 | Donohue |
| 6,233,567 B1 | 5/2001 | Cohen |
| 6,289,380 B1 | 9/2001 | Battat et al. |
| 6,289,382 B1 | 9/2001 | Bowman-Amuah |
| 6,324,578 B1 * | 11/2001 | Cox et al. ............. 709/223 |
| 6,477,471 B1 * | 11/2002 | Hedstrom et al. ....... 702/34 |
| 6,594,819 B1 * | 7/2003 | Ciarlante et al. ....... 717/170 |
| 6,735,701 B1 * | 5/2004 | Jacobson ............... 713/201 |

\* cited by examiner

┌──────────────────────────────┐  ┌──────────────────────────────┐  ┌──────────────────────────────┐
│ Employee Information         │  │ Hardware Inventory           │  │ Vendor Contact               │
│ Section              90      │  │ Information Section    94    │  │ Information Section    100   │
├──────────────────────────────┤  ├──────────────────────────────┤  ├──────────────────────────────┤
│ ⊢ Last Name    106           │  │ ⊢ Hardware Serial Number 204 │  │ ⊢ Vendor Name    298         │
│ ⊢ First Name   108           │  │ ⊢ Hardware Assignment and    │  │ ⊢ Vendor Business Address    │
│ ⊢ Middle Initial   110       │  │   Date 206                   │  │   300                        │
│ ⊢ Status    112              │  │ ⊢ Manufacturer Name    208   │  │ ⊢ City   302                 │
│ ⊢ Building    114            │  │ ⊢ Manufacturer Address   210 │  │ ⊢ State   304                │
│ ⊢ Room Code    116           │  │ ⊢ Warranty Information   212 │  │ ⊢ Zip Code   306             │
│ ⊢ Work Phone Number   120    │  │ ⊢ Hardware Specifications 218│  │ ⊢ Status Preferred    308    │
│ ⊢ User ID   124              │  │ ⊢ Acquisition Date    220    │  │ ⊢ Status Non-Preferred   310 │
│ ⊢ E-Mail Address    126      │  │ ⊢ Desktop Unit    222        │  │ ⊢ Quality Rating    312      │
│ ⊢ FAX Number   130           │  │ ⊢ Laptop Unit    226         │  │ ⊢ Customer Service Rating 314│
│ ⊢ Manager's Name    134      │  │ ⊢ Lease Information    230   │  │ ⊢ Contact Person    316      │
│ ⊢ Department Name    136     │  │ ⊢ Legal Ownership    236     │  │ ⊢ Payment Terms    320       │
│ ⊢ Department Code    140     │  └──────────────────────────────┘  │ ⊢ Vendor Relationships    322│
│ ⊢ Payroll Number    144      │                                    └──────────────────────────────┘
│ ⊢ Social Security Number 146 │  ┌──────────────────────────────┐
│ ⊢ Pay Cycle 150              │  │ Software Licenses            │
│ ⊢ Permanent Exempt    152    │  │ Information Section    96    │  ┌──────────────────────────────┐
│ ⊢ Permanent Non-Exempt   154 │  ├──────────────────────────────┤  │ Training Material            │
│ ⊢ Temporary Exempt    156    │  │ ⊢ Software Title    240      │  │ Information Section    102   │
│ ⊢ Temporary Non-Exempt   158 │  │ ⊢ Serial Number    242       │  ├──────────────────────────────┤
│ ⊢ Hourly Employee    160     │  │ ⊢ Manufacturer    244        │  │ ⊢ General Materials    324   │
│ ⊢ Contractor    162          │  │ ⊢ Description    246         │  │ ⊢ Purchased Software    326  │
│ ⊢ Variable Worker    164     │  │ ⊢ License Date    250        │  │ ⊢ Licensed Software    328   │
└──────────────────────────────┘  │ ⊢ Restrictions & Limitations 252│ │ ⊢ Obtain Materials    330  │
                                  │ ⊢ Employee Desktop           │  └──────────────────────────────┘
┌──────────────────────────────┐  │   Installation    254        │
│ Software Inventory           │  │ ⊢ Contract Licensing Details │  ┌──────────────────────────────┐
│ Information Section    92    │  │   258                        │  │ Software Management          │
├──────────────────────────────┤  │ ⊢ Function Comments    260   │  │ Business Self-Assessment     │
│ ⊢ Software Title    170      │  │ ⊢ Valid License Details    264│ │ Information Section    104   │
│ ⊢ Software Serial Number 174 │  └──────────────────────────────┘  ├──────────────────────────────┤
│ ⊢ Software Manufacturer 178  │                                    │ ⊢ Self-Assessment Responses  │
│ ⊢ Software Description    180│  ┌──────────────────────────────┐  │   332                        │
│ ⊢ Software Acquisition Date 184│ │ Business Unit and Contact   │  │ ⊢ Set of Questions    334    │
│ ⊢ Software Limitations   188 │  │ Information Section    98    │  │ ⊢ Audit Responses    336     │
│ ⊢ Employee Desktop Installation│├──────────────────────────────┤  │ ⊢ Self Assessment Comments   │
│   190                        │  │ ⊢ Department Title    270    │  │   338                        │
│ ⊢ Proof of purchase    192   │  │ ⊢ Manager Name    274        │  │ ⊢ Audit Committee Comments   │
│ ⊢ Function Comments    196   │  │ ⊢ Manager Social Security    │  │   340                        │
│ ⊢ Legal Ownership    200     │  │   Number 276                 │  │ ⊢ Business Unit Name    344  │
└──────────────────────────────┘  │ ⊢ Manager Mail Stop Code 278 │  │ ⊢ Location   346             │
                                  │ ⊢ Manager Phone Number 280   │  │ ⊢ Completed Self-Assessment  │
                                  │ ⊢ Contact Person Name    282 │  │   350                        │
                                  │ ⊢ Phone Number    284        │  │ ⊢ Software Management Sigma  │
                                  │ ⊢ Mail Code    286           │  │   Value    354               │
                                  │ ⊢ Address    288             │  │ ⊢ Self-Assessment    356     │
                                  │ ⊢ FAX Number    290          │  │ ⊢ Independent Audit    358   │
                                  │ ⊢ Relevant Information  294  │  └──────────────────────────────┘
                                  └──────────────────────────────┘
```

Software Management Process (Continued)

… # WEB-BASED SYSTEM FOR MANAGING SOFTWARE ASSETS

BACKGROUND OF THE INVENTION

This invention relates generally to management of software and, more particularly, to network-based systems and methods for tracking, managing and controlling software assets using an interactive database.

With the proliferation of computers and software, the issue of software management has become important to a business entity. Software, like other company assets, must be managed throughout its lifecycle to ensure maximum return on investment. Effective software management begins with sound procurement procedures, maintenance of current asset utilization records, and implementation of controls to ensure compliance with license requirements. Software management is a challenge for a business entity that is increasingly reliant upon the use of computer software to manage day-to-day operations. New challenges come with this increased reliance on software use across a global enterprise. These challenges create a continuing need to control and manage the business entity's software assets.

Software management is a global issue and is not an easy task. However, proper management of software can result in better control over software assets, more cost effective purchasing, maximum use of existing software, and the avoidance of potential penalties related to non-compliance with licensing requirements.

BRIEF SUMMARY OF THE INVENTION

In one aspect, the present invention is a software license management system (SLMS) that utilizes a web-based interactive database to automate a software management process (SWMP) for managing software assets, monitoring compliance to license requirements, and tracking/reporting status as necessary to assure adherence to implementation requirements of the software management process. The system captures software information and provides on-line up-to-date information upon request. In one exemplary embodiment, the system is implemented utilizing a Structured Query Language (SQL) server database with a client user interface front-end for administration and a web interface for standard user input and reports. The system manages software assets using the interactive database coupled to a system for tracking, monitoring and records retention activities associated with the process.

The SWMP establishes a standard high level process for software management to avoid litigation, fines and penalties, maximize software asset utilization through tighter inventory control, and capitalize on the software procurement process to obtain "best pricing". More specifically, the SWMP is a process consisting of five different phases. The SWMP includes identification of various solution alternatives including identification of specific software alternatives that meet business requirements. The process further includes acquisition of the software, deployment of the software, software maintenance and software retirement. The SWMP also provides a best practice for monitoring software license compliance on an ongoing basis. The SWMP maintains software inventories on the SLMS system web site, identifies software management process owners, and provides software reports on an as-needed basis to finance, legal and chief executive officers of a business entity. The SWMP further seeks out and shares software management best practices. The process, through internal controls, emphasizes that software should not be used, reproduced or distributed without the manufacturer's express authorization, which includes licensing. The SWMP establishes metrics and controls for each phase of the process to monitor the compliance to the process and provides reports aimed at identifying potential areas of non-compliance. The SLMS provides a formalized process to meet and manage the stringent legal and financial objectives associated with the software management. The SLMS also provides cost benefit to a business entity by streamlining the management process associated with software monitoring and compliance.

BRIEF DESCRIPTION OF THE DRAWINGS

FIG. 5 is an exemplary embodiment of a data and logic flow diagram of the SLMS shown in FIG. 2;

DETAILED DESCRIPTION OF THE INVENTION

Exemplary embodiments of systems and processes that facilitate integrated network-based electronic reporting and workflow process management related to a Software License Management System (SLMS) are described below in detail. The systems and processes facilitate, for example, electronic submission of information using a client system automated extraction of information, and web-based assessment reporting and management of Software for internal system users.

The systems and processes are not limited to the specific embodiments described herein. In addition, components of each system and each process can be practiced independent and separate from other components and processes described herein. Each component and process also can be used in combination with other components and processes.

Figure 1:
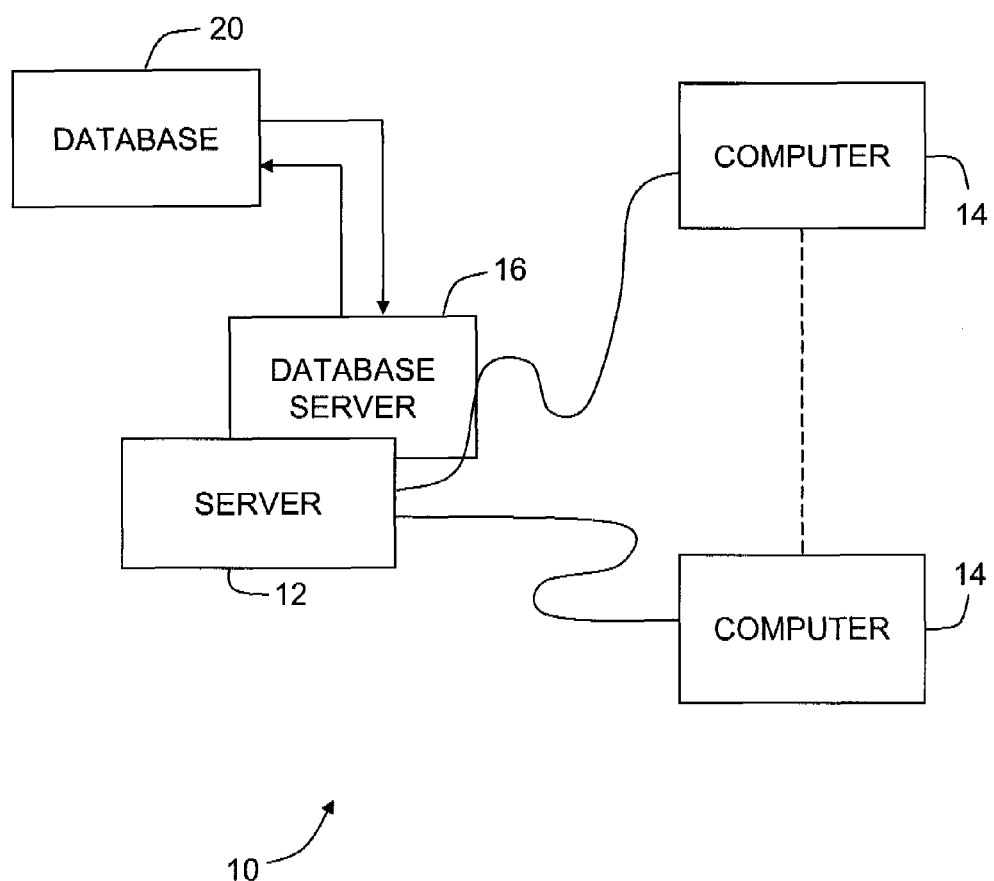
FIG. 1 is a simplified block diagram of a Software License Management System (SLMS) in accordance with one embodiment of the present invention.

FIG. 1 is a simplified block diagram of an SLMS 10 including a server system 12 and a plurality of client systems 14 connected to server system 12. In one embodiment, client systems 14 are computers including a web browser, and server system 12 is accessible to client systems 14 via the Internet. Client systems 14 are interconnected to the intranet through many interfaces including a network, such as a local area network (LAN), dial-in-connections, cable modems and special high-speed ISDN lines. Client systems 14 could be any device capable of interconnecting to the Internet including a web-based phone or other web-based connectable equipment. A database server 16 is connected to a centralized database 20 containing software product and license related information on a variety of software products, as described below in greater detail. Database server 16, is stored on server system 12 and can be accessed by potential users at one of client systems 14 by logging onto server system 12 through one of client systems 14. Database 20 information is stored on database server 16 and accessed trough server 12 system.

Figure 2:
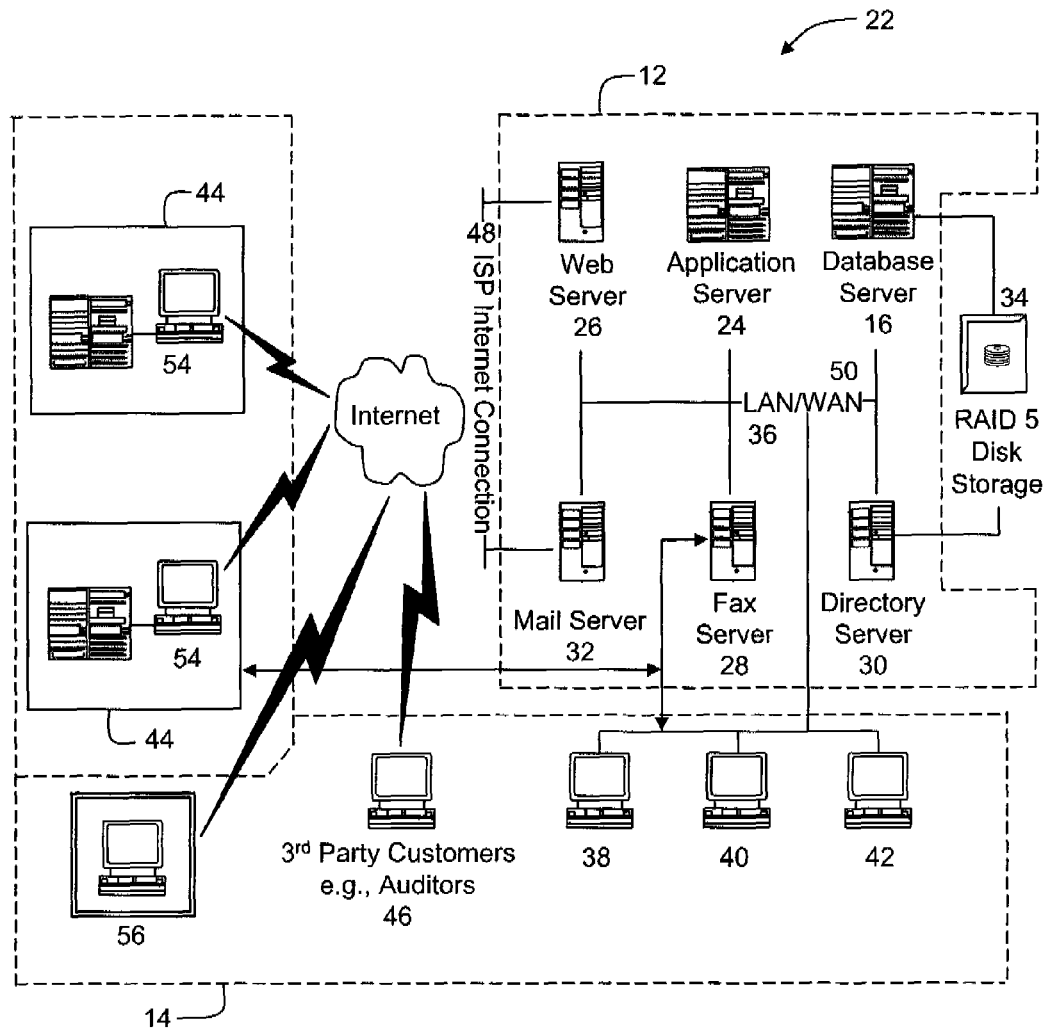
FIG. 2 is an expanded version block diagram of an exemplary embodiment of a server architecture of a Software License Management System (SLMS)

FIG. 2 is an expanded version block diagram of an exemplary embodiment of server architecture of an SLMS 22. Components in SLMS 22 identical to components of SLMS 10 (shown in FIG. 1) are identified in FIG. 2 using the same reference numerals as used in FIG. 1. SLMS 22 includes a server system 12 and client system 14. Server system 12 further includes a database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 and are connected through an intranet.

Each workstation, 38, 40, and 42 is a personal computer including a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

In another embodiment, server system 12 is configured to be communicatively coupled to various individuals or employees 44 and to third parties, e.g., internal or external auditors, 46 via an ISP Internet connection 48. The communication in the exemplary embodiment is illustrated via the Internet, however, any other wide area network (WAN) 50 type communication can be utilized in other embodiments, i.e., the systems and processes are not limited to being practiced via the Internet. In addition, and rather than a WAN, a local area network could be used in place of the WAN.

In the exemplary embodiment, any authorized individual or an employee of the business entity having a workstation 54 can access SLMS. One of client systems 14 includes a senior manager's workstation 56 located at a remote location. Workstations 54 and 56 are personal computers including a web browser. Also, workstations 54 and 56 are configured to communicate with server system 12. Furthermore, fax server 28 communicates with employees located outside business entity 44 and any of the remotely located client systems including a client system 56 via a telephone link. Fax server 28 is configured to communicate with other client systems 38, 40, and 42 as well.

Figure 3:
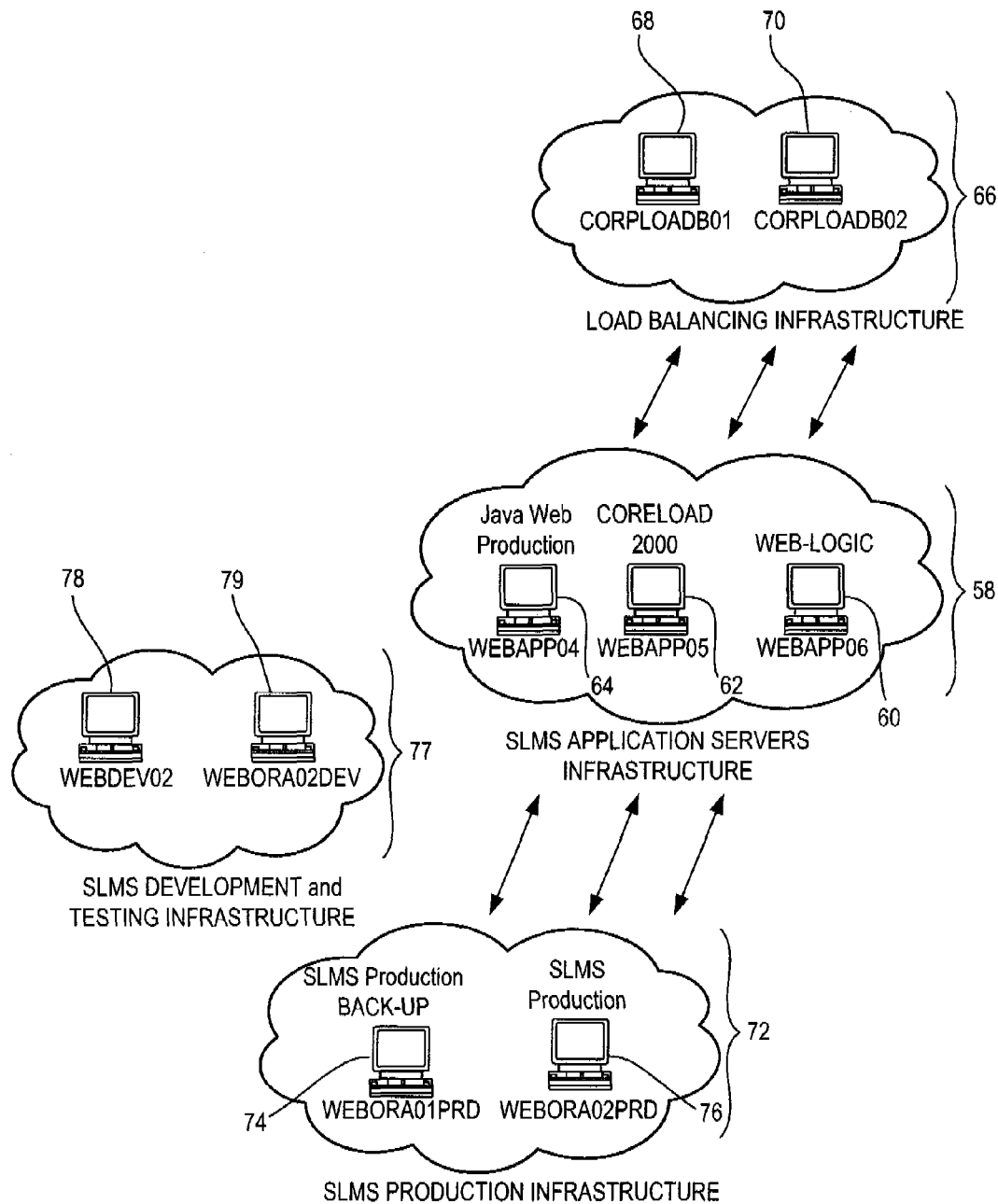
FIG. 3 is yet another exemplary embodiment of an infrastructure of the SLMS.

FIG. 3 is yet another exemplary embodiment of an infrastructure of SLMS 22. SLMS Application Server Infrastructure 58 includes various production servers that host and operate the SLMS application. A Webapp06 is a WebLogic production server 60 that hosts the Java production SLMS application. This is the front end of the application that users sign into which hosts the English, French, German, and Japanese localized sites. Webapp05 is a production server 62 hosts the LiveWire version of the SLMS application and it also retains the special enterprise licensed software products such as Coreload 2000 used by various departments and divisions of the business entity. Coreload 2000 can be directly downloaded from production server 62 and installed by users. Finally, webapp04 is the designated testing infrastructure server 64 for Web-Logic development.

The Load Balancing Infrastructure 66 include corploadb01 server 68 and corploadb02 server 70. These servers are the business entity's systems infrastructure shared servers which equally distributes (i.e. balances) the production load during periods of peak activity.

The SLMS shared production infrastructure 72 include webora01prd server 74 and webora02prd server 76. These servers are the servers that house all SLMS production data and performs the back-end functionality of the production data files. Webora02prd server 76 specifically retains the SLMS data and provides the back end support and high-speed performance needed for SLMS data manipulation (i.e. SLMS report generation). Webora01prd server 74 is the back-up server for Webora02prd server 76.

The SLMS Development and Testing Infrastructure 77 consists of two separate servers—webdev02 server 78 and webora02dev server 79. Webdev02 server 78 is used for SLMS coding and application testing and is part of the SLMS initial development testing infrastructure. Webora02dev server 79 is the oracle based testing server which houses and duplicates the SLMS data that resides on webora02prd server 76.

Figure 4:
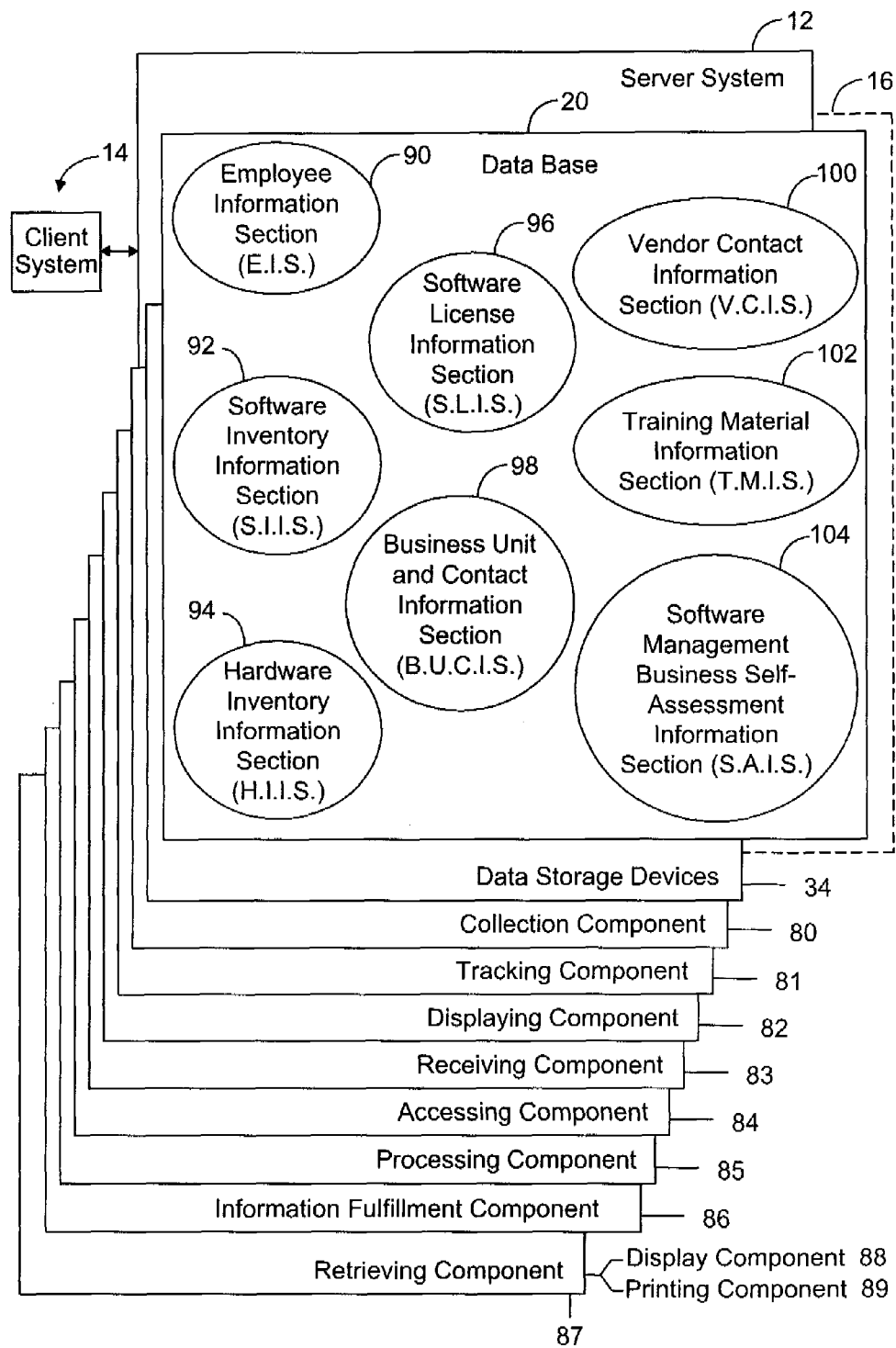
FIG. 4 shows a configuration of a database within a database server of a server system including other related server components.

FIG. 4 illustrates a configuration of a database 20 within database server 16 of server system 12 shown in FIG. 1. Database 20 is coupled to several separate components within server system 12, which perform specific tasks.

Server system 12 includes a collection component 80 for collecting information from users into centralized database 20, a tracking component 81 for tracking information, a displaying component 82 to display information, a receiving component 83 to receive a specific query from client system 14, and an accessing component 84 to access centralized database 20. Receiving component 83 is programmed for receiving a specific query from one of a plurality of users. Server system 12 further includes a processing component 85 for searching and processing received queries against data storage device 34 containing a variety of information collected by collection component 80. An information fulfillment component 86, located in server system 12, downloads the requested information to the users in the order in which the requests were received by receiving component 83. Information fulfillment component 86 downloads the information after the information is retrieved from data storage device 34 by a retrieving component 87. Retrieving component 80 retrieves, downloads and sends information to client system 14 based on a query received from client system 14 regarding various alternatives.

Retrieving component 87 further includes a display component 88 configured to download information to be displayed on a client system's graphical user interface and a printing component 89 configured to print information. Retrieving component 87 generates many types of various reports requested by the user through client system 14 in a pre-determined format. System 10 is flexible to provide other alternative types of reports and is not constrained to the embodiments set forth above.

Database 20 is divided into an Employees Information Section (EIS) 90, a Software Inventory Information Section (SIIS) 92, an Hardware Inventory Information Section (HIIS) 94, a Software License Information Section (SLIS) 96, a Business Unit and Contact Information (BUCIS) 98, a Vendor Contact Information Section (VCIS) 100, a Training Material Information Section (TMIS) 102, and a Software Management Business Self Assessment Information Section (SAIS) 104. These eight sections within database 20 are interconnected to update and retrieve the information as required.

FIG. 5 is an exemplary embodiment of data and logic flow diagram of SLMS 10 (not shown in FIG. 4). It further depicts the organization of a searchable database 20 built in SQL server. FIG. 5 shows the data and logic relationship among Employees Information Section (EIS) 90, Software Inventory Information Section (SIIS) 92, Hardware Inventory Information Section (HIIS) 94, Software Licenses Information Section (SLIS) 96, Business Unit and Contact Information (BUCIS) 98, Vendor Contact Information Section (VCIS) 100, Training Material Information Section (TMIS) 102, and Software Management Business Self-Assessment Information Section (SAIS) 104 of database 20.

EIS 90 includes basic employee information such as a last name of an employee 106, a first name of the employee 108, a middle initial of the employee 110, a status of the employee 112, a building 114 and room code 116 where the employee is located, a work phone number 120, a user identification 124, an e-mail address 126, a facsimile number 130, a manager's name 134 who has direct supervisory authority over the employee, a department name 136 and code of the department 140, a payroll number 144, a social security number 146, and a pay cycle 150 category such as weekly, biweekly and monthly. EIS 90 further segregates employee data by employee category to identify whether an employee is a permanent exempt employee 152, a permanent non-exempt employee 154, a temporary exempt employee 156, a temporary non-exempt employee 158, an hourly employee 160, a contractor 162, or a variable worker 164 of the department within a business entity.

SIIS 92 includes information such as a software title 170, a software serial number 174, a software manufacturer 178, a brief description of the software 180, a date on which software was acquired 184, restrictions or limitations on software use 188, employees on whose desktop the software was installed 190, purchase order details relating to the software verifying the proof of purchase 192, any comments on software functionality 196, and other pertinent details useful to prove legal ownership and use of the software 200.

HIIS 94 stores information such as a hardware serial number 204, employee whom the specific hardware has been assigned to and the date on which assigned 206, details on the hardware such as a manufacturer's name 208, an address 210, warranty information 212, hardware capabilities including specifications 218, month and a year of acquisition 220, hardware classification such as a desktop unit 222 or a laptop unit 226, any lease related information 230, if applicable, and other pertinent details useful to prove legal ownership and use of the hardware 236.

SLIS 96 stores information such as a software title 240, a software serial number 242, a software manufacturer 244, a brief description of the software 246, a date on which software was licensed 250, restrictions or limitations on software use 252, employees on whose desktop the software was installed 254, contract details relating to the software licensing verifying the license 258, any comments on software functionality 260, and other pertinent details useful to prove valid licensing and use of software 264.

BUCIS 98 stores department and organizational information which includes a department title 270, a manager's name 274, a manager's social security number 276, a manager's mail stop code 278, and a telephone number or extension 280. It also includes information pertaining to business unit contact person's name 282, phone number 284, mail code 286, address 288, facsimile number 290 and other relevant information 294. As the organizational changes occur, the relationship changes are constantly updated and changed in database 20 to keep the information current.

VCIS 100, includes information relating to vendor such as a vendor name 298, a vendor's business address 300 including a city 302, state 304 and zip code 306, vendor status such as preferred 308 or non preferred 310, quality rating of the vendor 312, customer service rating of the vendor 314, contact person's name for the vendor 316, terms on which the vendor expects to get paid 320, and any other vendor relationship details 322 regarding the vendor.

TMIS 102 includes general training materials 324 available on the web site for each of the software purchased 326 or licensed 328 and how to obtain such training materials 330.

SAIS 104 stores information regarding self assessment responses 332 against a set of specific questions 334, responses of independent audit 336 against a set of specific questions 334, any self-assessment comments 338 or comments by an audit committee 340. Business unit's name 344, location 346, and a person completing self-assessment 350 is also included in the database. Compliance to the overall software management process based on the response of the self-assessment is computed in terms of "Software Management Sigma Value" 354 as achieved by self-assessment 356 and as scored by an independent audit 358 is stored in database 20.

Figure 6:
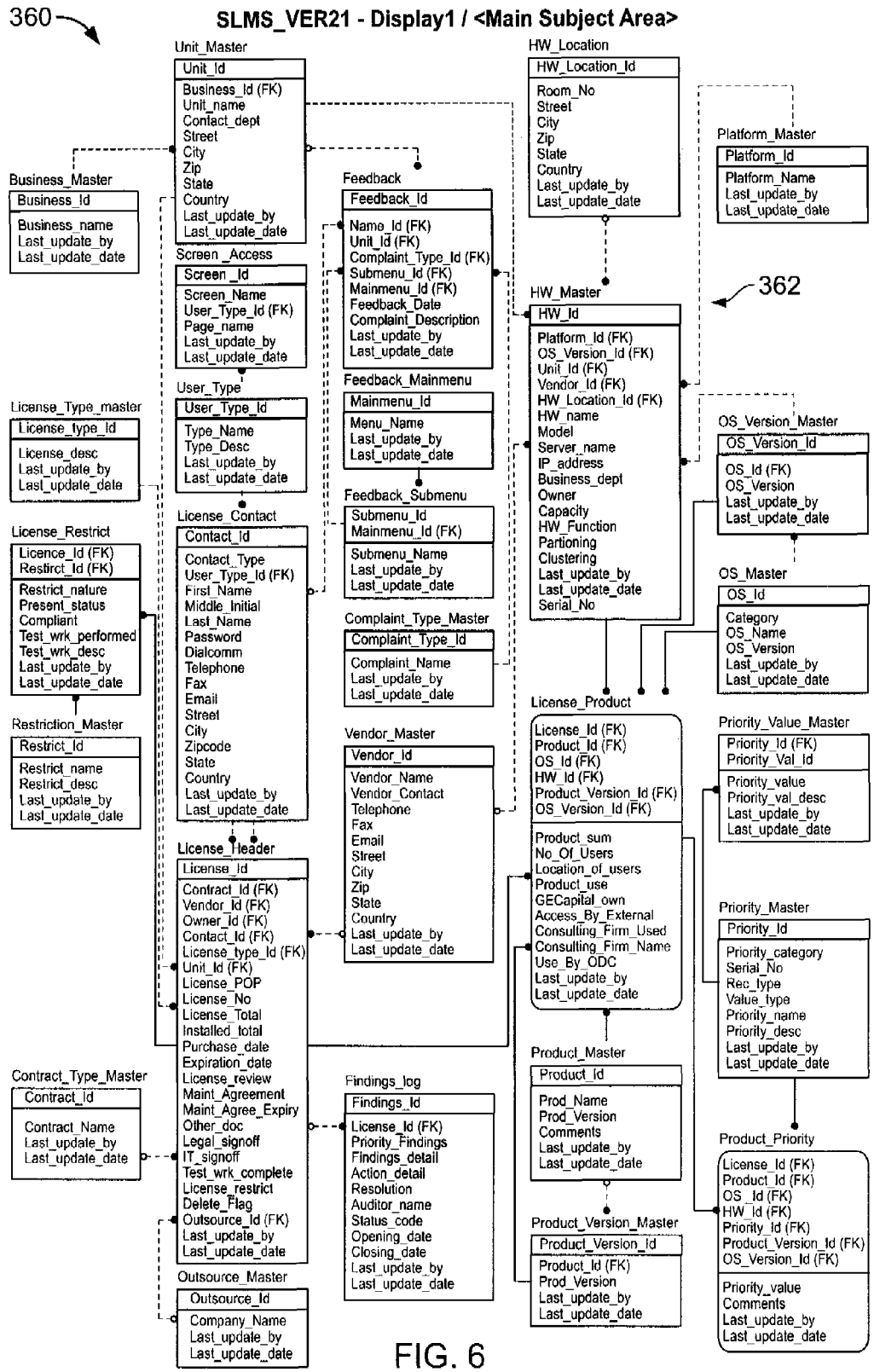
FIG. 6 is another exemplary embodiment of a database structure depicting logical relationship of the data stored in database structure of the SLMS.

FIG. 6 is another exemplary embodiment 360 of a database structure depicting logical relationship of the data stored in database 20 structure of SLMS 22. FIG. 6 further depicts as to how the data is linked in database 20.

Several categories of information are captured by SLMS 22. The data is collected and linked by category. The categories of information captured include, but are not limited to, Business Name, Business Sub-units with Addresses, Security or Screen Access with User information, License Type, License Restrictions, Contract Type, License Contact Person, Outsourcers, Software Vendors and Addresses, Feedback information (user's can enter feedback or complaints about the application), Findings by Auditors, Hardware Description, Hardware Location, Operating System information, Product Priority (rates criticality of the software to the business), and Platform (which describes what the software runs on). The dotted lines 362 ending in a dark black circle show a one-to-many relationship between the data groups. For example, there is one master that can have several associated entries.

The architectures of systems 10 as well as various components of system 10 are exemplary only. Other architectures are possible and can be utilized in connection with practicing the processes described below.

Figure 7:
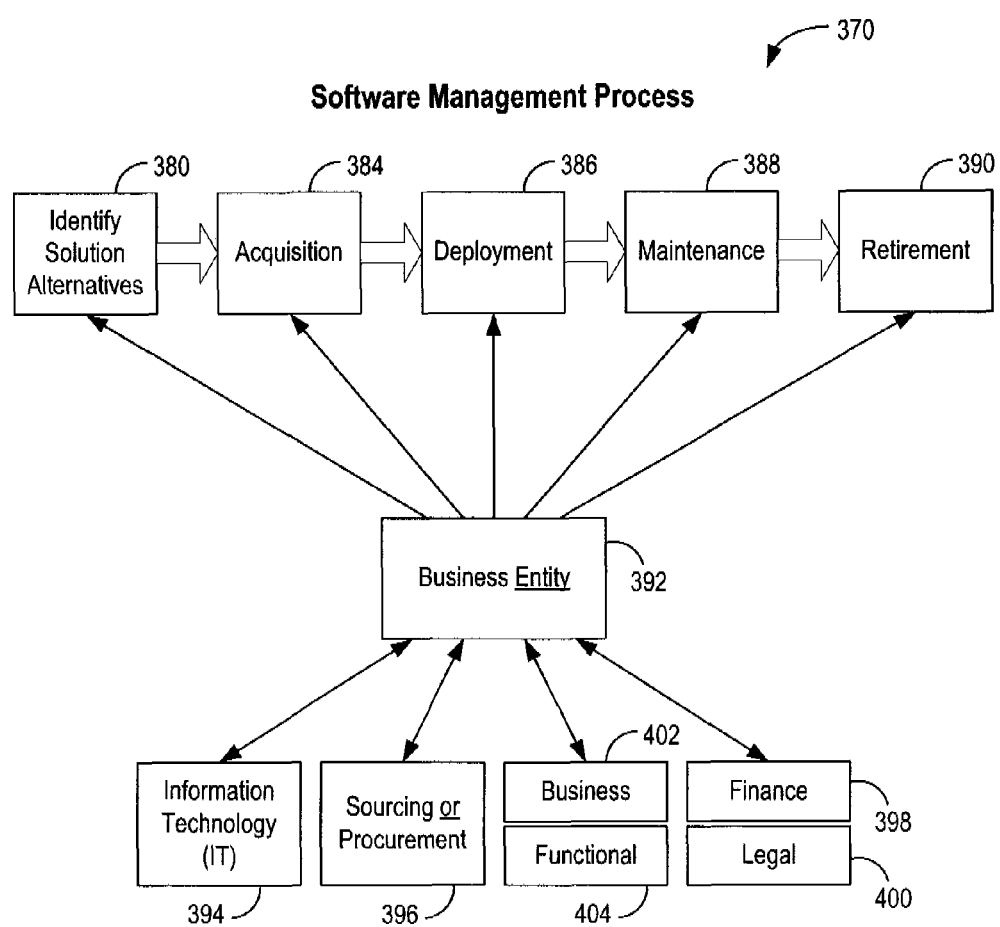
FIG. 7 is an exemplary embodiment of the Software Management Process (SWMP) as implemented by the SLMS shown in FIG. 2.

FIG. 7 is an exemplary embodiment of SWMP 370 as implemented by SLMS 10 (shown in FIG. 1). SWMP 370 is a process consisting of five (5) different phases. SWMP 370 involves identification of various solution alternatives 380 including identification of a specific software solution. SWMP involves acquisition of the software 384, deployment of the software 386, maintenance 388 and finally ending with software retirement 390. Most importantly, SWMP 370 provides a best practice for monitoring software license compliance on an ongoing basis. SWMP 370 maintains software inventories on the system web site, identifies software management process owners, and provides software reports on an as-needed basis to finance legal and chief executive officers of a business entity 392. SWMP 370 further seeks out and shares software management best practices. It emphasizes that software should not be used, reproduced or distributed without the manufacturer's express authorization, which includes licensing. Additionally, SWMP 370 focuses on software license information and managing the licensing information as well as acquisitions of various software on an ongoing basis to avoid liability to the business entity. SWMP 370 and system 10 are flexible enough to capture the requirement of various departments of a business entity, which includes an Information Technology (IT) department 394 (often referred as IT or Information Technology), a Sourcing or Procurement department 396, a Finance department 398, a legal department 400, a Business department 402 and a Functional department 404 of the business entity. IT 394, Sourcing 396, Finance 398, and Legal 400 are responsible for defining and interpreting the software management requirements within the business entity in relation to the SWMP 370.

The sourcing department and the contract owner are responsible for terminating software contracts and notifying IT Department 394 of such termination. Information Technology department 394 is responsible for informing end users of contract termination and destroying the software from individual systems.

Finance department 398 is responsible for monitoring the cost of acquisitions as well as maintenance and deployment while Legal department 400 is responsible for compliance with legal requirements.

Metrics and controls monitor the SWMP 370. At each phase in the process, tollgates/milestones are established and monitored to a specific measurement process. Additionally, monitoring of software licenses by various departments within the business unit provide reports aimed at identifying potential areas of noncompliance. Furthermore, the business entity periodically engages in external audit firms and/or corporate audit staff to monitor adherence to SWMP 370.

Each Information Technology (IT) organization within the various business entity is responsible for ensuring that all the computers and hardware have only properly licensed software installed. IT department 394 also performs random audits of installed software. IT or Information Technology department is used here as a generic reference to the local technology or information systems group assigned to each department of a business entity. Any unlicensed software found on hardware throughout the organization is immediately removed, thereby avoiding future liability. Anyone who uses or distributes unauthorized software in their organization is to immediately notify their manager to avoid future consequences.

1.0 Identify Solution Alternatives 380

Figure 8:
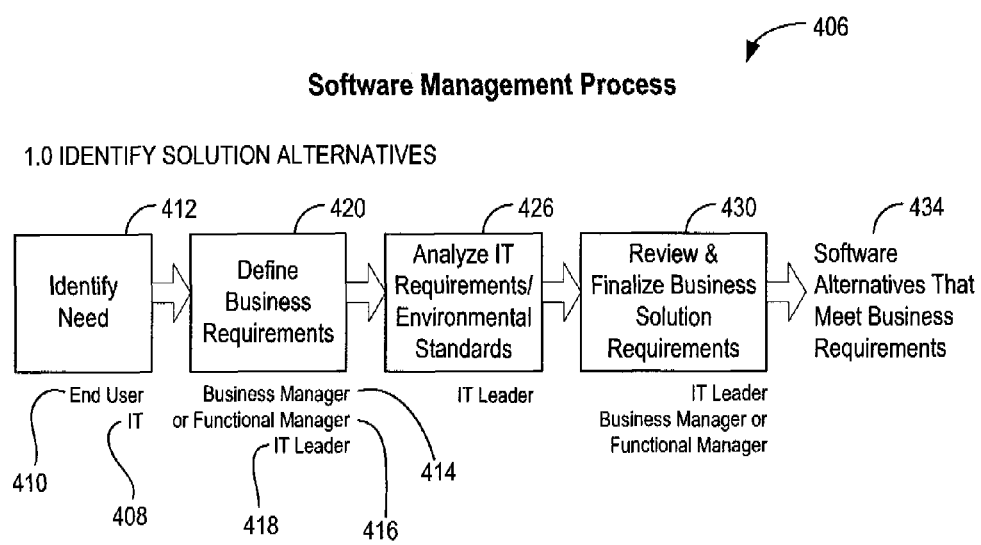
FIG. 8 is an exemplary embodiment of a first phase of the SWMP identifying solution alternatives.

FIG. 8 is an exemplary embodiment depicting detail process steps 406 of a first phase of SWMP, which involves identifying solution alternatives 380 shown in FIG. 7. During the first phase of the SWMP 370, Information Technology (IT) 408 and end users 410 personnel identify the need 412 for a software solution to a business issue. A business manager 414 or a functional manager 416 and an IT leader 418 define the business requirements 420. IT leader 418 is the lead information technology person assigned to a specific project by the business chief information officer (CIO). CIO is the individual responsible for managing information technology within a business entity. IT leader 418 analyzes the IT requirements 426, including the current computer limitation and any existing technological standards that need to be implemented. Finally, IT leader 418 and the business or functional manager, review the requirements again and finalize the business solution requirements 430. The tollgate/milestone for this phase is the documentation of business requirements 420 and identification of software alternatives 434.

2.0 Acquisition 384

Figure 9:
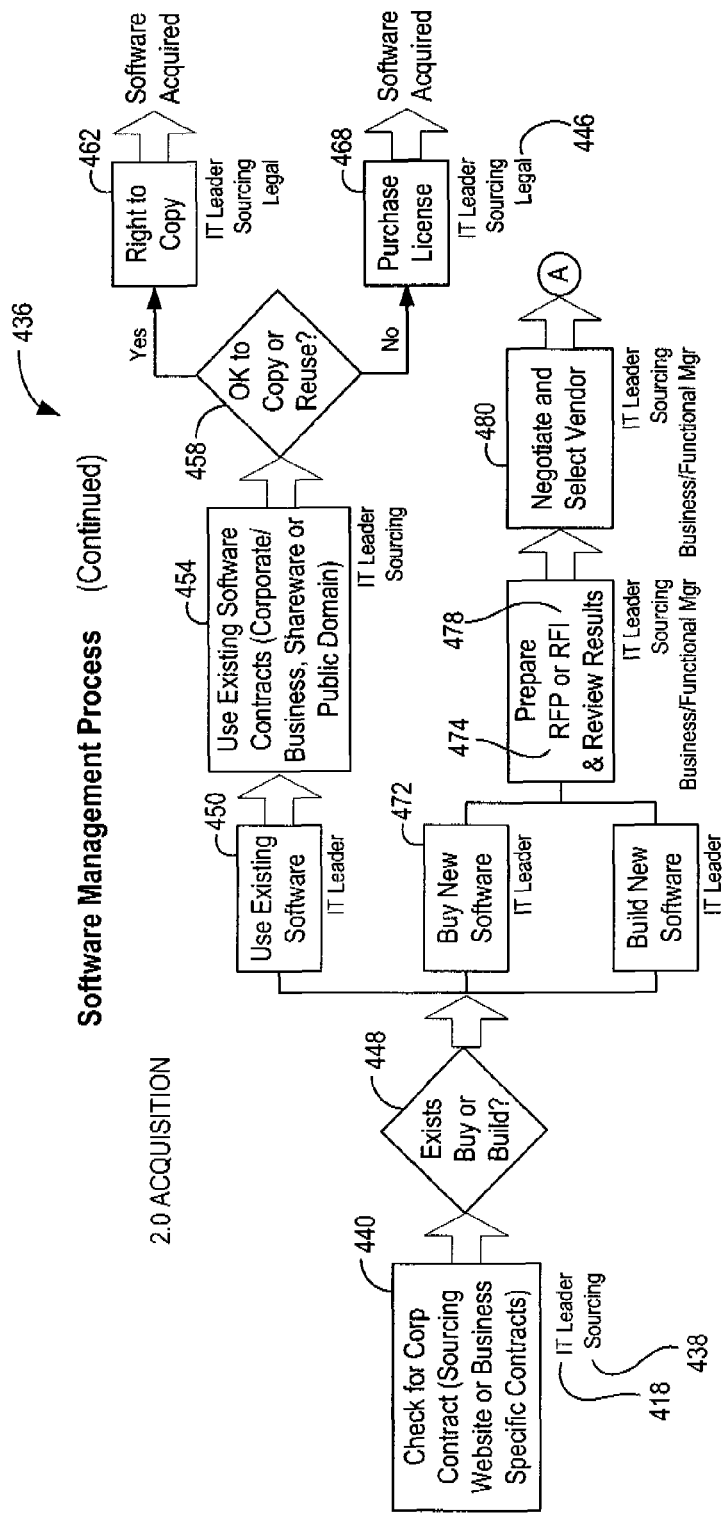
FIG. 9 is an exemplary embodiment of an acquisition phase of the SWMP.

FIG. 9 is an exemplary embodiment depicting detail process steps 436 of an acquisition phase 384 (shown in FIG. 7). During acquisition phase 384 (shown in FIG. 7), IT leaders 418 (shown in FIG. 8) and Sourcing 438 check for existing software contracts 440 that may meet the requirements defined in the previous phase (identify solution alternatives phase 380). Sourcing 438 as used herein is a generic reference to a local sourcing personnel assigned within a business entity to manage procurement/sourcing functions including activities associated with initiating and managing software contracts. These contracts may be corporate or individual business contracts within the business entity. All contracts are entered into the sourcing department's sourcing web site for monitoring and tracking. All software contracts are also accessible to any individual inquiring about a specific contract through SLMS 10 web site.

If there is a corporate or business software product that meets the requirements, IT leader 418, Sourcing 438 and/or legal representative 446 determine 448 whether the license agreement allows the business entity to copy and reuse the existing software 450. If shareware or public domain software or existing software 454 is to be used, the IT department 408 (shown in FIG. 8) evaluates 458 whether the software can be legally copied and used. If the business entity has the "right to copy" 462, the software is copied. If there is no "right to copy" 462 but a standard agreement exist, the IT department with the help of the Sourcing department purchases licenses 468 following their routine software purchasing process. The Legal department is kept informed to ensure the compliance with the legal requirements. Shareware or public domain software is a software that is distributed freely on a trial basis with the understanding that the user may need or want to pay for that software at a later date. Some shareware has a built in expiration date (usually 30 to 60 days) and other shareware is the software with some of the capabilities disabled provided at the earlier stage to entice a consumer to buy the complete version.

Once IT leader 418 determines that a new software product 472 should be purchased, the purchasing process is initiated. IT leader 418, Sourcing 438, or a business/functional manager prepares and submits a requisition or a request for proposal (RFP) 474 and/or request for information (RFI) 478 to prospective vendors. The software contract terms and prices are negotiated 480 and a final vendor 482 is selected. IT leader 418, Sourcing 438, and Legal department representative 446 negotiate the terms and conditions into the contract.

Figure 10:
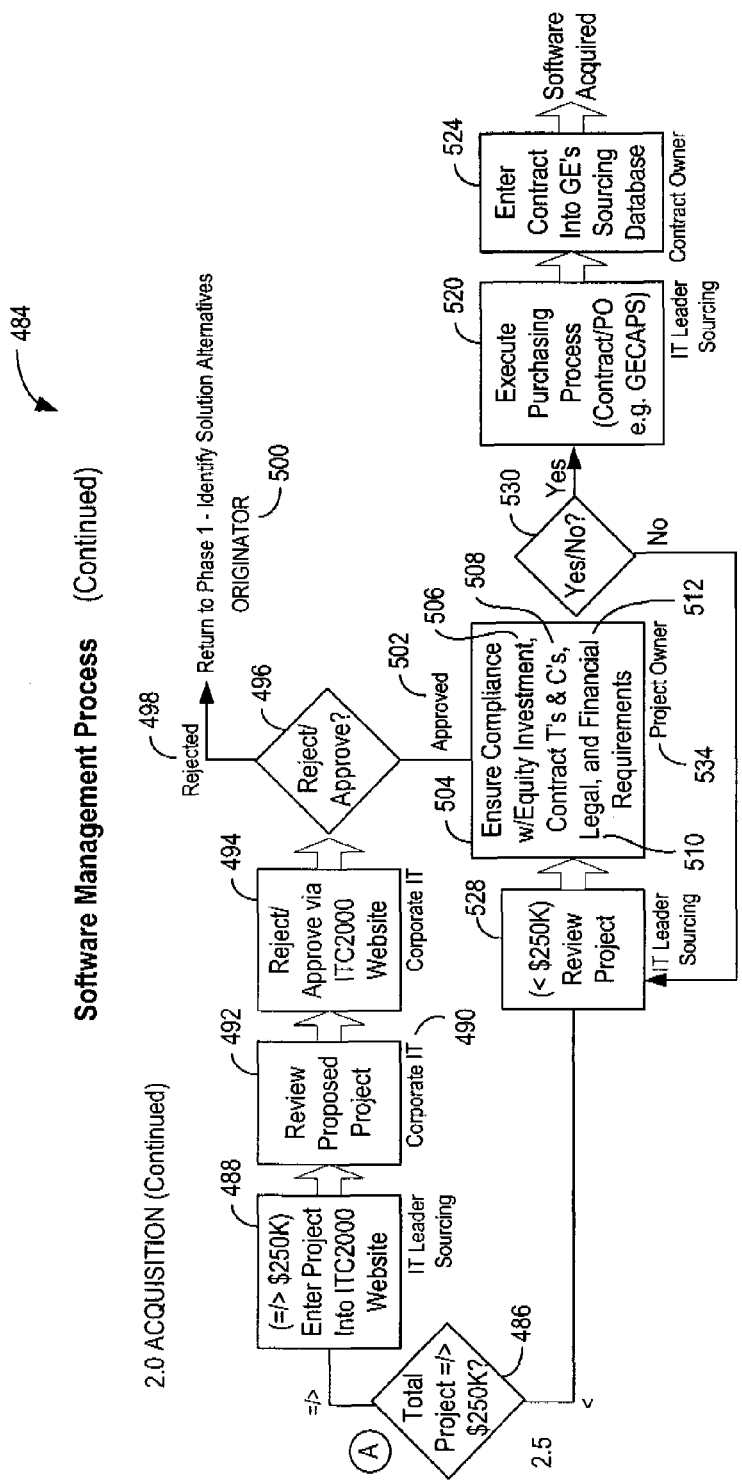
FIG. 10 is an exemplary embodiment of a continuation of the acquisition phase of the SWMP.

FIG. 10 is an exemplary embodiment of a continuation depicting detail process steps 484 of acquisition phase 384 shown in FIG. 7. If the total project cost including software, hardware, and consulting is equal to or greater 486 than a predetermined amount, e.g. $250,000, the project is entered 488 into database 20. Corporate Information Technology group (IT) 490 reviews the project 492 entry request and either approves or rejects 494 the request. Corporate IT 490 refers to the Corporate IT functions located in a headquarters of the corporation, the corporation the business entity reports to, and the business entity reporting to the Chief Technology and Information Officer of the ITC 2000 business entity belongs to. Approval or rejection decision 496 is done via a web site thereby avoiding unnecessary delays in handling the paperwork between various offices. If the project is rejected 498, the request is sent back to an originator 500 and originator 500 is requested to identify solution alternatives again and resubmit the project request.

If the project is approved 502, the project owner ensures that the project complies 504 with equity investment opportunities/obligations 506, standard contract terms and conditions 508, legal agreement requirements 510, and financial/accounting requirements 512. If all requirements are met, IT leader 418 or Sourcing 438 (shown in FIG. 9) execute the purchasing process 520 which involves generating contracts or purchase orders for the acquisition of the software. The contract information is then entered 524 into the Sourcing web site database.

If the total project cost is less 528 than the predetermined amount, either IT leader 418 or Sourcing 436 reviews the project and ensures that the project meets 530 the overall objectives of the business. If the project is approved, the project owner again ensures that the project complies 504 with equity investment opportunities/obligations 506, standard contract terms and conditions 508, legal agreement requirements 510, and financial accounting requirements 512. If all of the above requirements are met 530, again IT leader 418 or Sourcing 438 (shown in FIG. 9) initiates the purchasing process 520 which includes generating contract or purchase orders as required for the acquisition of the software.

Before acquisition of any software, IT leader 418, sourcing 438 or the project owner 534 ensures that the software is being purchased from the preferred vendor list and are also adhering to the project approval guidelines including return on investments. License terms and conditions are carefully checked before signing the agreement. Additionally, software, which is obsolete or new to the market, is carefully avoided. Prior to executing the purchase contract or purchase agreement, the process owner also ensures that if there is any unused or under utilized software within the business entity or other businesses within the corporation. The tollgate/milestone for this phase is the acquisition of the software, such unused or under utilized software is put to use prior to purchase of the new software.

3.0 Deployment 386

Figure 11:
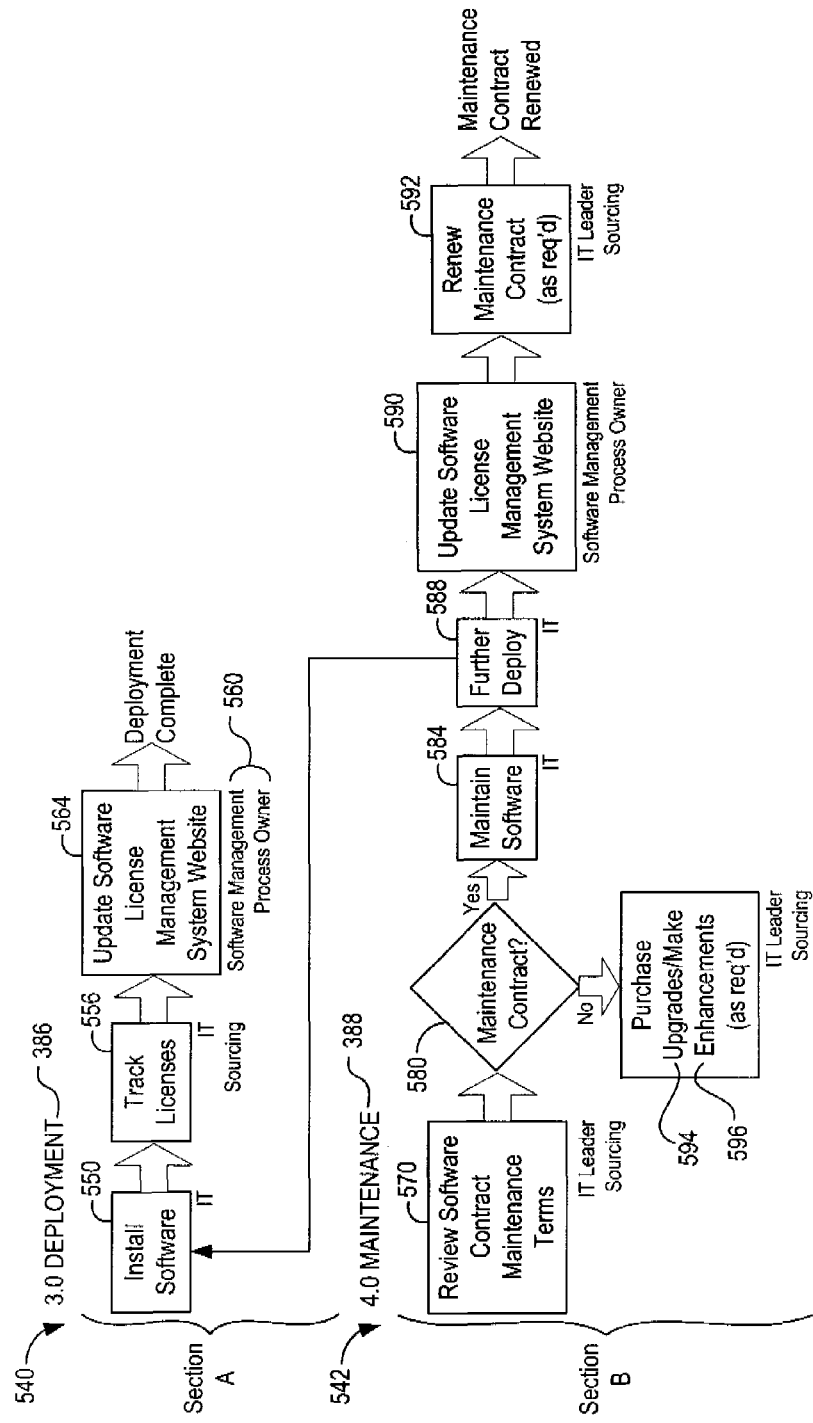
FIG. 11 is an exemplary embodiment of a deployment phase of the SWMP as well as an exemplary depictment of a maintenance phase and its relationship to a deployment phase of the SWMP.

FIG. 11 is divided into Section A and Section B. Section A of FIG. 11 is an exemplary embodiment depicting detail process steps 540 of deployment phase 386 (shown in FIG. 7). Section B of FIG. 11 also depicts detailed process steps 542 of maintenance phase 388 (shown in FIG. 7). FIG. 11 identifies the relationship between deployment phase 386 as well as maintenance phase 388. Information technology (IT) group either installs 550 or authorizes the installation of software on computers. For legal and financial reasons the business entity manages the software as an asset. This includes knowing where software is installed, who is authorized to use it and when the license expires. Within the business entity, IT and/or Sourcing are responsible for tracking 556 all software licenses being used by their business. Software management process owner 560 updates 564 database 20 through SLMS 10. System 10 updates database 20 as soon as the software information is added or changed. The tollgate/milestone of the deployment phase 386 is reached when the software has been deployed.

4.0 Maintenance 388

Section B of FIG. 11 depicts detail process steps of a maintenance phase and its relationship to deployment phase. Information technology (IT) department 394 and sourcing department 396 (shown in FIG. 7) are responsible for reviewing 570 software contract maintenance terms. When the business entity has a maintenance contract 580, IT is authorized by this contract to maintain the software 584. The contract to maintain the software involves installing updated enhancements as appropriate. If additional software from the same agreement is deployed at a later date 588, the deployment process steps 540 described under the deployment phase of SWMP 370 is followed. When software is upgraded, enhanced or further deployed, it is the responsibility of the software management process owner 560 to update 590 the business entity software information in database 20. The database 20 is updated through device 14 with the help of server system. Maintenance contract 580 is renewed 592, as required.

If the business entity has no maintenance contract 580 on file, IT leader and sourcing representative purchase upgrades 594 or make enhancements 596, as required to support business requirements. The tollgate/milestone of the maintenance 388 phase is reached when the maintenance contract is renewed.

5.0 Retirement 390

Figure 12:
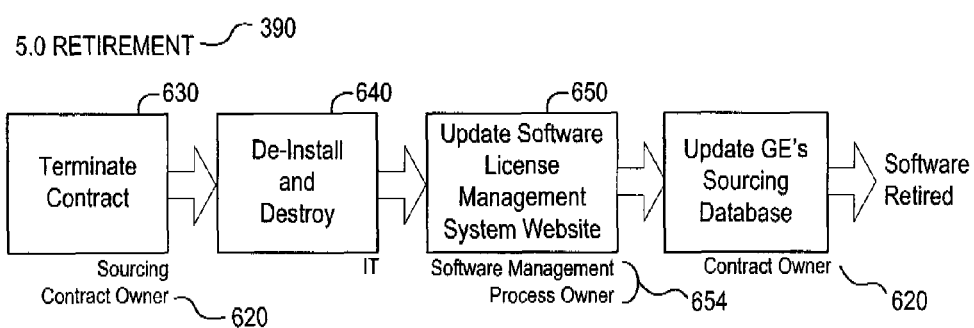
FIG. 12 is an exemplary embodiment of a retirement phase of the SWMP.

FIG. 12 is an exemplary embodiment depicting detail process steps 600 of a retirement phase 390 (shown in FIG. 7). The Information technology (IT) representative, a contract owner 620 and business process owner jointly determine when a software product is no longer required. Sourcing representative and/or contract owner 620 with the help of the legal department terminate 630 the contract. When the contract is terminated, IT department is notified by the contract owner to de-install and destroy 640 any remaining software. The IT department must notify the end users prior to de-installing the software. The software management process owner 654 updates 650 the software information in the database. Software Management Process Owner 654 is responsible for updating 650 database 20 and ensuring the proper accountability. Contract Owner 620 is also responsible for updating the business entity's main database (not shown) and ensuring the integrity of all the software contracts, whether open or terminated with software vendors. Updating of the database is done through a client device 14, which also updates server system 12. The database information is updated periodically which includes at a minimum quarterly updates. The tollgate/milestone of the retirement phase 390 is reached when the software has been retired.

6.0. Software Management Business Self-Assessment 656

Figure 13:
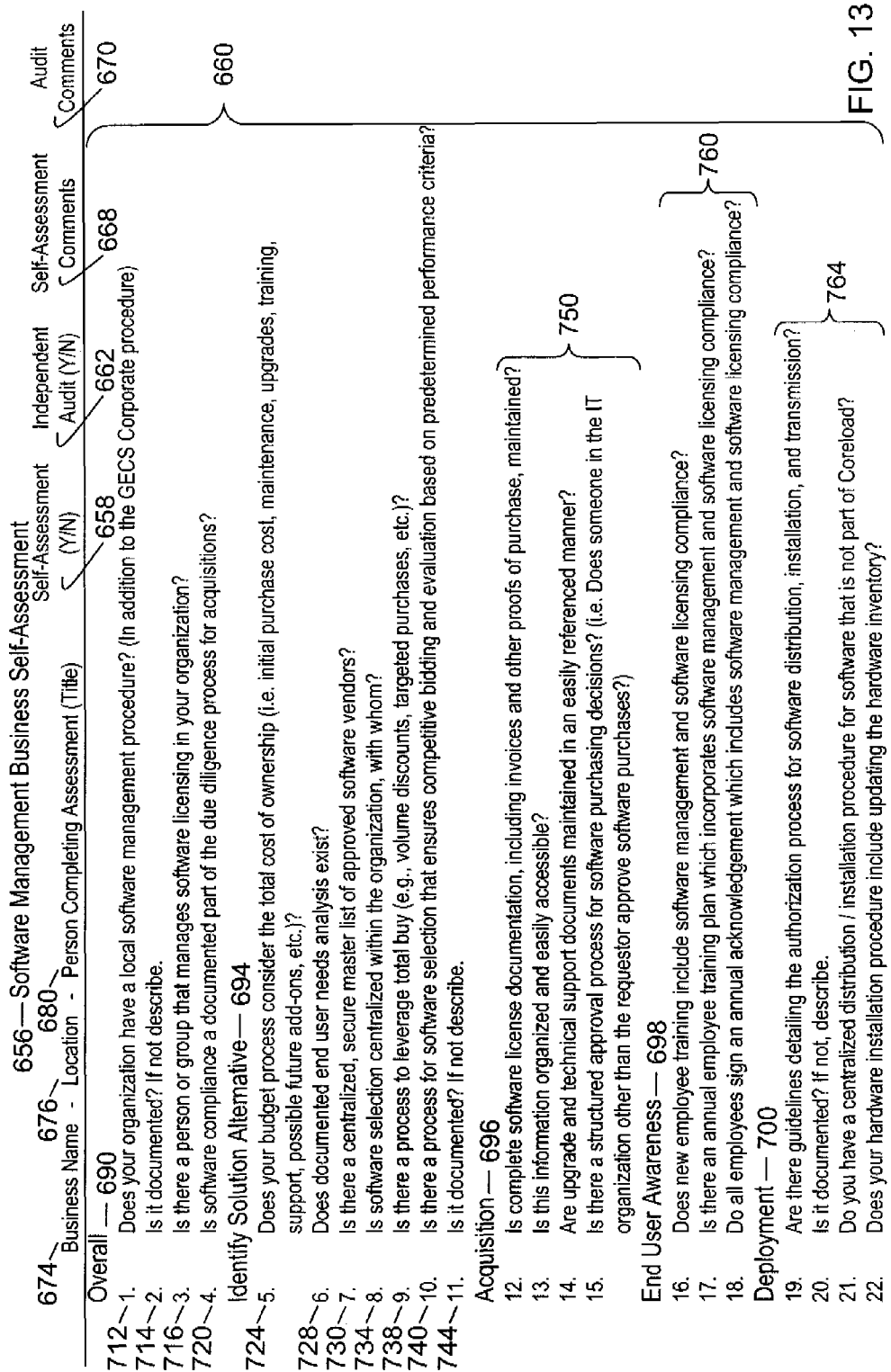
FIG. 13 is an exemplary embodiment of a Software Management Business Self-Assessment (SMBSA) worksheet as used in implementing the SWMP.

FIG. 13 is an exemplary embodiment of Software Management Business Self-Assessment 656 (SMBSA) worksheet as downloaded by server system 12 and displayed on device 14. Software Management Business Self-Assessment 656 involves self assessment responses 658 against a set of specific questions 660, responses of independent audit 662 against a set of specific questions 660, any self assessment comments 668 or comments by an audit committee 670. Business unit'name 674, location 676, and a person completing self-assessment 680 is entered by the respondent. Compliance to the overall software management process based on the response of the self-assessment is computed in terms of "Software Management Sigma Value" 684 (shown in FIG. 14), which is stored in database 20 for future reference.

Specific questions 660 include various categories of questions such as a category relating to overall background 690, a category for identifying a solution alternative 694, a category relating to acquisition 696, a category relating to end user awareness 698, a category relating to deployment 700 a category relating to monitoring and evaluation 704, a category relating to maintenance 708, and a category relating to retirement 710.

Each of the categories in specific questions 660 seeks detailed information. For example, the category relating to overall background 690 seeks information as to whether the organization has a local software management procedure 712, whether the procedure is documented 714, whether there is a person or group managing the software licensing of the organization 716, and whether software compliance is a documented part of the due diligence process for acquisitions 720.

The category relating to identifying solution alternative 694 seeks information as to whether the organization's budget process considers the total cost of ownership 724, whether there is a documented end user needs analysis 728, whether there is a centralized secure master list of approved software vendors 730, whether software selection is centralized within the business, and if so, with whom 734, whether there is a process to leverage total buy 738, whether there is a process for software selection that ensures competitive bidding and evaluation based on predetermined performance criteria 740, and whether such software selection process is documented 744.

Similarly other categories of questions in specific questions 660 seek various information as depicted in FIG. 13. For example, the category relating to acquisition 696 seeks information 750 as to whether complete software license documentation is maintained, how the documentation is organized, how upgrade and technical support documents are maintained for referencing purposes, and other information. The category relating to end user awareness 698 seeks detailed information 760 regarding new and annual employee training plans. The category relating to deployment 700 seeks detailed information 764 regarding the authorization process for software distribution, installation and transmission.

Figure 14:
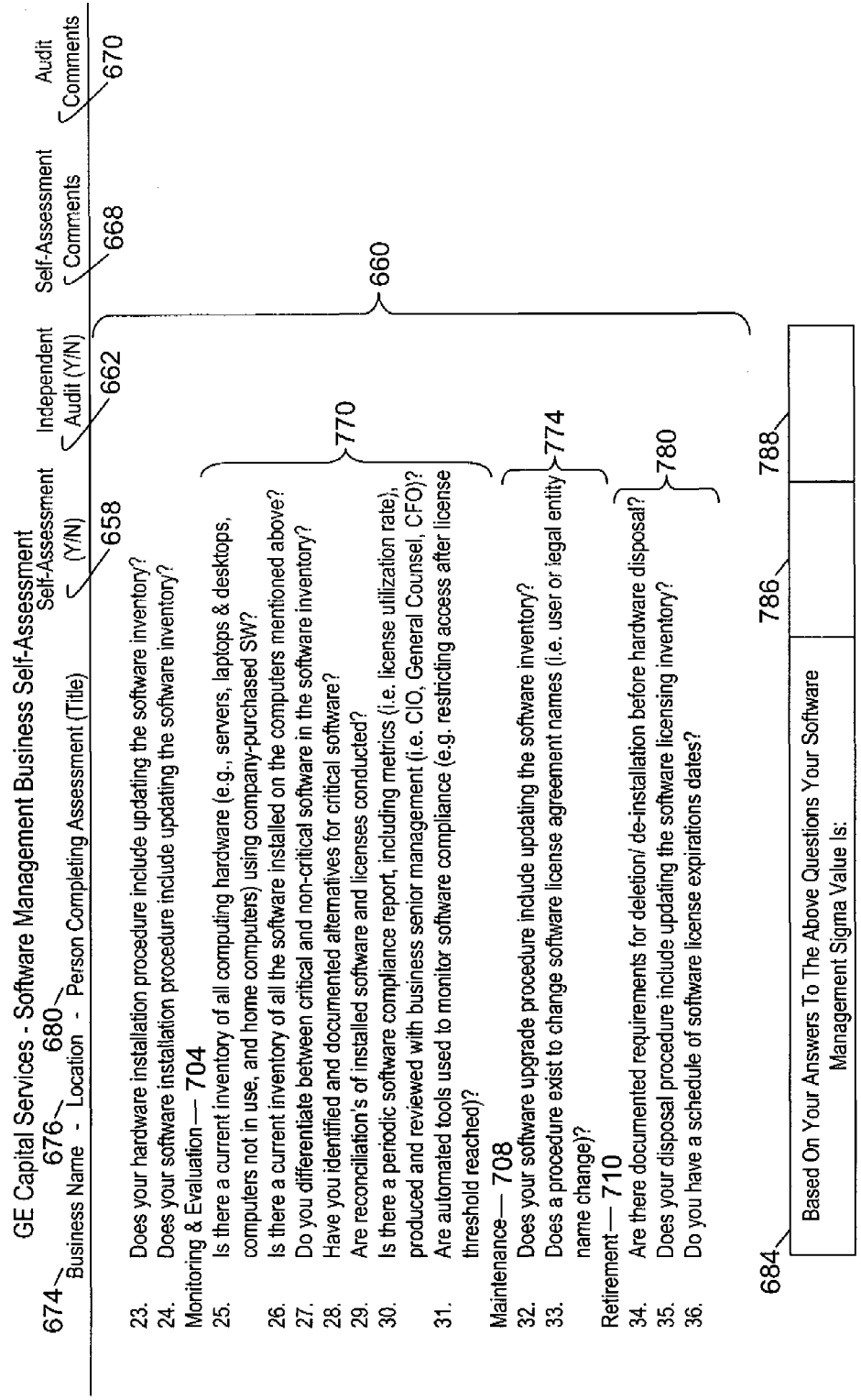
FIG. 14 is a continuation of an exemplary embodiment of the Software Management Business Self-Assessment (SMBSA) worksheet shown in FIG. 11 as used in implementing the SWMP.

FIG. 14 is a continuation of an exemplary embodiment of Software Management Business Self-Assessment 656 (SMBSA) worksheet as downloaded by server system 12 (not shown) and displayed on device 14 (not shown). The category relating to monitoring and evaluation 704 seeks detailed information 770 regarding current inventory of computing hardware as well as installed software. The category relating to maintenance 708 seeks information 774 regarding software upgrade procedures and changing software license agreement user or business entity names. The category relating to retirement 710 seeks detailed information 780 regarding documented requirements for deletion/de-installation before hardware disposal. Compliance to the overall software management process based on the response of the self-assessment is computed in terms of "Software Management Sigma Value" 684, which is stored in database 20 for future reference. Software Management Sigma Value 684 is expressed with reference to "Self Assessment" 786 and "Independent Audit" 788.

Figure 15:
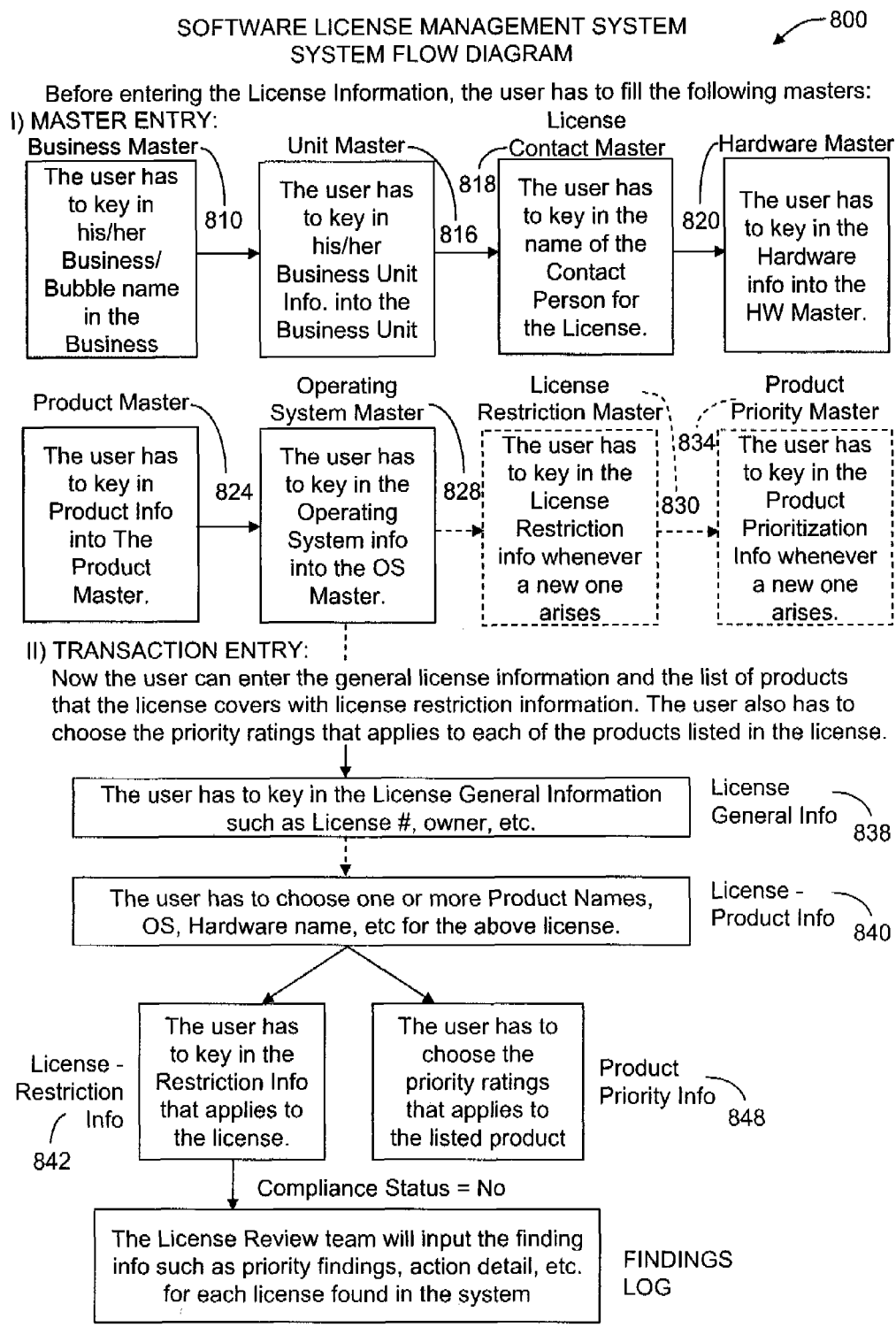
FIG. 15 is an exemplary embodiment of a simplified version of a SLMS system flow diagram.

FIG. 15 is an exemplary embodiment of a system flow diagram 800. According to system flow diagram 800, the user is requested to fill out a Business Master 810, a Unit Master 816, a License Contact Master 818, a Hardware Master 820, a Product Master 824, an Operating System Master 828, a License Restriction Master 830, and a Product Priority Master 834. Through specified fields, these masters request information such as the User's Business Name, Address, Contact Information, Product Information, Operating System Information, License Restriction Information, and Product Prioritization Information. Once the user has completed master information entry, the user enters License General Information 838 and a License Product Information 840 that lists one or more product names, operating system, hardware details that a given license covers. The user is also required to input License Restriction Information 842 identifying the restriction that applies to the license, and Product Priority Information 848 identifying the priority rating that applies to the listed product. If the system flags the compliance status with the license as a negative compliance, the License Review Team inputs their findings and appropriate action details for each non-compliant license. The system offers the user an option to provide the information through pre-determined fields or provide data through drop down menus.

In an exemplary embodiment (not shown), SLMS 22 utilizes a process that is entirely automated. Under this embodiment, the software selection process is online and provides viable alternatives based on requirements. Once the software required is identified, the SLMS 22 searches the database 20 to determine whether surplus software inventories exist that would fill the requirement. If no surplus software is available, a purchase order would be placed electronically to order the software from an approved supplier. SLMS 22 tracking information is also identified by the requestor in the original purchase order request. Upon fulfillment of the order, SLMS is automatically updated with the appropriate information taken directly from the purchase order system. SLMS 22 detects missing information and sends an email to the requestor to ask for the missing information. In addition, any software installed or deinstalled on a server system 12, mainframe or PC is automatically added to or updated in the SLMS database through the use of inventory tools and push technologies that are directly linked into SLMS 22. SLMS 22 reduces the amount of manual effort required to maintain an accurate inventory and to manage/control software assets.

In yet another exemplary embodiment (not shown), SLMS 22 accepts software license information and purchaser information directly from the purchasing system (Ulysses). This means that when a software order is ultimately filled, the software and purchaser information documented in the original purchase order is automatically downloaded directly into SLMS 22 eliminating a large portion of the manual entry process. SLMS 22 is linked directly into the Human Resources system so that when an employee leaves the company, SLMS 22 is automatically updated and sends a message to the responsible manager thereby allowing the manager to use SLMS 22 to reassign the software or list the software as surplus inventory that can be redeployed to another employee (given that the license permits this type of transfer). SLMS 22 periodically sends the senior executives a list of all surplus software that is available for redeployment. SLMS 22 is also linked directly to the inventory tools and push technologies used by the business entity to install or deinstall software on mainframes, servers and PCs. When software is installed or deinstalled on any server, mainframe or PC, these technologies automatically notify SLMS 22 thereby immediately updating database 20.

Figure 16:
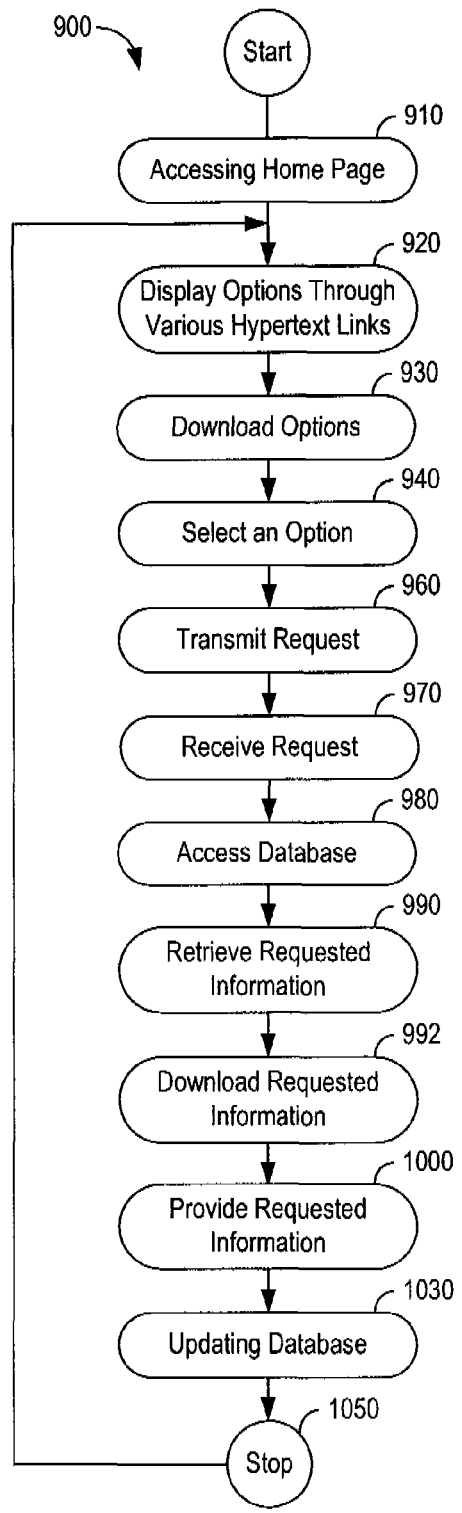
FIG. 16 is a flow chart as utilized by the SLMS.

FIG. 16 is a flow chart 900 as utilized by SLMS 10 (shown in FIG. 1). Under SLMS 10, a user accesses 910 a home page of the web site through client system 14 (not shown). Server system 12 (not shown) displays 920 and downloads 930 several options. Once the user selects 940 a specific option out of various hypertext links, the request is sent to server system 12. Transmitting 960 the request is accomplished by clicking a mouse. Once server system 12 receives 970 the request, server system 12 accesses 980 database server 16 and retrieves 990 related information from database 20 (not shown). The requested information is downloaded 992 and provided 1000 to client system 14 from server 12. The user continues to search database 20 for other information, updates 1030 database 20 with new or revised information or exits 1050 from system 10. In one embodiment, client system 14, as well as server system 12, are protected from access by unauthorized individuals. As described, Software License Management System (SLMS) 10 is an interactive searchable database 20 for all software related information and provides flexibility to employees as well as management to stay current with the software related information to-date. The system provides the ability for managers, employees and database administrators to directly update, review and generate reports of current information.

While the invention has been described in terms of various specific embodiments, those skilled in the art will recognize that the invention can be practiced with modification within the spirit and scope of the claims.

What is claimed is:

1. A method for managing software assets of a business entity using a web-based system including a server system coupled to a centralized database and at least one client system, the business entity having a software management process, said method comprising:

identifying at least one software asset satisfying a predetermined requirement of the business entity;

initiating and completing an acquisition process of the at least one software asset satisfying the predetermined business requirement;

deploying the acquired software asset including installing the acquired software asset on at least one of the server system and the at least one client system, the deployed software asset is accessed using the at least one client system;

storing in the centralized database information relating to the acquired software asset owned or licensed by the business entity including storing terms and conditions of a corresponding software license;

maintaining the acquired software asset licensed by the business entity including reviewing each the software license and installing updated software on at least one of the server system and the at least one client system when provided by the software license;

retiring the acquired software asset when the acquired software asset is no longer required by the business entity including de-installing the acquired software asset; and auditing the acquired software asset owned or licensed by the business entity by:

transmitting data from the server to the at least one client system to display an assessment worksheet on the at least one client system;

displaying in the assessment worksheet at least two questions including whether complete software license documentation has been maintained at the user's location, and whether a reconciliation of installed software and licenses has been conducted by the user;

inputting a response by the user to the at least two questions presented in the assessment worksheet;

inputting to the server the response received from the user to the at least two questions presented in the assessment worksheet; and determining compliance with the software management process including compliance with the terms and conditions of the software license corresponding to the acquired software asset by:

calculating at the server a sigma value based at least in part on the response inputted by the user; providing results to the user.

2. A method according to claim 1 wherein said step of identifying at least one software asset further comprises the steps of storing and updating information into the database relating to each identified software asset.

3. A method according to claim 2 wherein said steps of storing and updating information into the database further comprises the step of storing and updating at least as one of a last name of an employee, a first name of the employee, a middle initial of the employee, a status of the employee, a building and room code where the employee is located, a work phone number, a user identification, an e-mail address, a facsimile number, a manager's name who has direct supervisory authority over the employee, a department name and code of the department, a payroll number, a social security number, and a pay cycle category such as weekly, biweekly and monthly.

4. A method according to claim 3 wherein said steps of storing and updating information into the database further comprises the step of storing and updating at least one of a software title, a software serial number, a software manufacturer, a brief description of the software, a date on which software was acquired, restrictions or limitations on software use, employees on whose desktop the software was installed, purchase order details relating to the software verifying the proof of purchase, comments on software functionality, and details useful to prove legal ownership and use of the software.

5. A method according to claim 3 wherein said steps of storing and updating information into the database further comprises the step of storing and updating at least one of a serial number for hardware, a name of an employee whom the specific hardware has been assigned to and the date on which assigned, details on the hardware such as a manufacturer's name, an address, warranty information, hardware capabilities including specifications, month and a year of acquisition, hardware classification such as a desktop unit or a laptop unit, lease related information, if applicable, and details useful to prove legal ownership and use of the hardware.

6. A method according to claim 3 wherein said steps of storing and updating information into the database further comprises the step of storing and updating at least one of a department title, a manager's name, a manager's social security number, a manager's mail stop code, a telephone number and an extension, a business unit contact person's name, a telephone number, mail code, address, and facsimile number of the contact person.

7. A method according to claim 3 wherein said steps of storing and updating information into the database further comprises the step of storing and updating at least one of a vendor name, a vendor's business address including a city, state and zip code, vendor status such as preferred or non preferred, quality rating of the vendor, customer service rating of the vendor, contact person's name for the vendor, terms on which the vendor expects to get paid, and vendor relationship details regarding the vendor.

8. A method according to claim 3 wherein said steps of storing and updating information into the database further comprises the step of storing and updating at least one of general training materials available for each of the software purchased and licensed and instructions on how to obtain such training materials.

9. A method according to claim 3 wherein said steps of storing and updating information into the database further comprises the step of storing and updating at least one of self assessment responses against a set of specific questions, responses of independent audit against a set of specific questions, any self assessment comments, comments by an audit committee, business unit's name, location, and a person completing self assessment, and compliance information relating to the software management process.

10. A method according to claim 1 wherein said step of identifying at least one software asset further comprises the step of defining business requirements to be addressed by the software asset.

11. A method according to claim 1 wherein said step of identifying at least one software asset further comprises the step of analyzing information technology requirements.

12. A method according to claim 1 wherein said step of identifying at least one software asset further comprises the step of analyzing environmental standards.

13. A method according to claim 1 wherein said step of identifying at least one software asset further comprises the step of reviewing and finalizing business solution requirements.

14. A method according to claim 1 wherein said step of identifying at least one software asset further comprises the step of identifying software alternatives that meet business requirements.

15. A method according to claim 1 wherein said step of initiating and completing acquisition process further comprises the steps of evaluating and checking for existing software contracts.

16. A method according to claim 1 wherein said step of initiating and completing an acquisition process further comprises the steps of:
  making a decision to at least one of use an existing software, buy a new software, and build a new software; and
  implementing the decision to at least one of use an existing software, buy a new software, and build a new software.

17. A method according to claim 16 wherein said step of implementing the decision further comprises the steps of:
  reviewing results of the decision;
  preparing and submitting at least one of a request for proposal and a request for information to prospective vendors and reviewing results; and
  negotiating and selecting a vendor to acquire the software.

18. A method according to claim 16 wherein said step of implementing the decision further comprises the step of deciding at least one of copying an existing software and purchasing additional licenses for the existing software.

19. A method according to claim 17 wherein said step of reviewing results of the decision further comprises the step of at least one of approving the decision and rejecting the decision based on subjective and objective criteria.

20. A method according to claim 17 wherein said step of reviewing results of the decision further comprises the step of entering the decision into the database.

21. A method according to claim 17 wherein said step of reviewing results of the decision further comprises the step of ensuring compliance with equity investments guidelines, contract terms and conditions, and legal and financial requirements prior to acquisition of the software.

22. A method according to claim 17 wherein said step of negotiating and selecting a vendor to acquire the software further comprises the step of executing at least one of a purchase order and a contract to acquire the software.

23. A method according to claim 1 wherein said step of deploying the acquired software further comprises the steps of:
  tracking licenses; and
  updating the database with the current information relating to licenses.

24. A method according to claim 1 wherein said step of maintaining the acquired software asset further comprises the steps of:
  reviewing maintenance terms of a software license; and
  purchasing upgrades for the software license.

25. A method according to claim 1 wherein said step of maintaining each the acquired software asset further comprises the step of maintaining software licensed by the business entity.

26. A method according to claim 1 wherein said step of maintaining the acquired software asset further comprises the step of further deploying an upgraded version of the software.

27. A method according to claim 1 wherein said step of maintaining the acquired software asset further comprises the step of updating software purchase related information into the database.

28. A method according to claim 1 wherein said step of maintaining the acquired software asset further comprises the step of updating software license related information into the database.

29. A method according to claim 1 wherein said step of maintaining the acquired software asset further comprises the step of renewing a maintenance contract for each software asset having such a maintenance contract.

30. A method according to claim 1 wherein said step of retiring a software asset further comprises:
  de-installing and destroying software in accordance with a license to use the software; and
  updating the database with revised licensing information.

31. A method according to claim 1 wherein said step of retiring a software asset further comprises:
  de-installing and destroying software in accordance with a license to use the software; and
  updating the database with purchasing information.

32. A method according to claim 1 wherein said step of auditing the acquired software asset further comprises the steps of evaluating and assessing exposure of a department within the business entity.

33. A method according to claim 1 wherein said steps of calculating a sigma value further comprises the steps of comparing sigma values computed for each department within the business entity.

34. A method according to claim 32 wherein said step of auditing the acquired software asset further comprises the steps of developing and implementing corrective actions to improve the performance of the business entity.

35. A method according to claim 1 wherein said method further comprising the step of entering information at least through one of a device connected to the client system.

36. A method according to claim 1 wherein said method further comprising the step of providing information in response to an inquiry.

37. A method according to claim 36 wherein said step of providing information in response to an inquiry further comprises the steps of:
    downloading requested information from a server system; and
    displaying requested information on a client system in response to the inquiry.

38. A method according to claim 36 wherein said step of providing information further comprises the step of printing requested information in a pre-determined format.

39. A method according to claim 36 wherein said step of providing information further comprises the step of accepting an inquiry from a user.

40. A method according to claim 39 wherein said step of accepting an inquiry further comprises the steps of:
    displaying information on the client system; and
    receiving an inquiry from the client system.

41. A method according to claim 40 wherein said step of receiving an inquiry from the client system further includes the steps of submitting a request through pull down menus.

42. The method according to claim 40 wherein said step of displaying information further includes displaying an HTML document downloaded by the server system.

43. The method according to claim 1 wherein the client system and the server system are connected via a network and wherein the network is one of a wide area network, a local area network, an intranet and the Internet.

44. A computer-implemented method for tracking software assets owned and licensed by a business entity using a computer coupled to a database, the business entity having a software management process, said method comprising:
    accessing the database containing software assets information including data relating to each software asset owned or licensed by the business entity including terms and conditions of each corresponding software license;
    searching the database regarding a specific inquiry received from a user;
    retrieving information from the database;
    causing the retrieved information to be displayed on the computer for tracking, monitoring and auditing purposes; and
    auditing each software asset owned or licensed by the business entity by:
        transmitting data for a selected software asset from the database to the computer to display an assessment worksheet on the computer;
        displaying in the assessment worksheet at least two questions including whether complete software license documentation has been maintained at the user's location, and whether a reconciliation of installed software and licenses has been conducted by the user;
        inputting a response by the user to the at least two questions presented in the assessment worksheet;
        inputting to the computer the response received from the user to the at least one question displayed two questions presented in the assessment worksheet; and
        determining compliance with the software management process including compliance with the terms and conditions of the software license corresponding to the acquired software asset by:
            calculating at the computer a sigma value based at least in part on the response inputted by the user;
            providing results to the user.

45. A method for tracking software assets owned and licensed by a business entity using a web-based server system coupled to a database and at least one client system, the business entity having a software management process, said method comprising:
    displaying on the client system for a user a software management assessment check list that includes at least two questions including whether complete software license documentation has been maintained at the user's location, and whether a reconciliation of installed software and licenses has been conducted;
    inputting a response by the user to each question included within the software management assessment check list; and
    determining compliance with the software management process including compliance with the terms and conditions of the software license corresponding to the acquired software asset by:
        calculating a sigma value based at least in part on the responses inputted by the user and on guidelines pre-stored within the database, the calculations are performed using the server system; providing results to the user.

46. A computer-implemented method for tracking software assets owned and licensed by a business entity and providing a software management sigma value based on pre-stored information, the business entity having a software management process, said method comprising:
    storing in a database information relating to a software asset owned or licensed by the business entity including storing terms and conditions of a corresponding software license;
    displaying on a computer system an assessment worksheet including questions relating to the software asset;
    displaying in the assessment worksheet at least two questions including whether complete software license documentation has been maintained at the user's location, and whether a reconciliation of installed software and licenses has been conducted by the user;
    inputting a response by the user to the at least two questions presented in the assessment worksheet;
    inputting to the computer system the user's response to the at least two questions presented in the assessment worksheet;
    determining compliance with the software management process including compliance with the terms and conditions of the software license corresponding to the acquired software asset by:
    analyzing user input against a pre-determined criteria; and
    calculating a sigma value based at least in part on the responses inputted by the user and on guidelines pre-stored within the database; providing results to the user.

47. A web-based system for managing software assets of a business entity, the business entity having a software management process, said system comprising:
    a client system,
    a centralized database for storing information, and a server system configured to be coupled to said client system and said centralized database, said web-based system further comprising:
  means for identifying at least one software asset satisfying a predetermined requirement of the business entity;
  means for initiating and completing an acquisition process of the at least one software asset satisfying the predetermined business requirement;
  means for prompting a user to deploy the acquired software asset including installing the acquired software asset on at least one of the server system and the client system, the deployed software asset is accessed using the client system;
  means for storing in the database information relating to the acquired software asset including storing terms and conditions of a corresponding software license;
  means for maintaining the acquired software asset including prompting the user to review the software license and installing updated software on at least one of the server and the client system as provided by the software license;
  means for prompting the user to retire a the acquired software asset when the acquired software asset is no longer required by the business entity including de-installing the acquired software asset; and
  means for auditing the acquired software asset by:
    transmitting data from the server to the client system to display an assessment worksheet on the at least one client system;
    displaying in the assessment worksheet at least two questions including whether complete software license documentation has been maintained at the user's location, and whether a reconciliation of installed software and licenses has been conducted by the user;
    inputting a response by the user to the at least two questions presented in the assessment worksheet;
    inputting to the server the response received from the user to the at least two questions presented in the assessment worksheet; and
    determining compliance with the software management process including compliance with the terms and conditions of the software license corresponding to the acquired software asset by:
      calculating at the server a sigma value based at least in part on the response inputted by the user.

48. A system according to claim 47 wherein said client system further comprising:
  a displaying component; and
  a sending component to send an inquiry to the server system so that the server system can process and download the requested information to the client system.

49. A system according to claim 48 wherein the sending component functions in response to a click of a mouse button.

50. A system according to claim 48 wherein the sending component functions in response to a voice command.

51. The client system of claim 48 wherein said server system is protected from access by unauthorized individuals.

52. A system according to claim 47 wherein said server system further comprising:
  a collection component for collecting information from users into the centralized database;
  a tracking component for tracking information on an on-going basis;
  a displaying component for displaying information;
  a receiving component for receiving an inquiry from the client system; and
  an accessing component to access the centralized database and causing the retrieved information to be displayed on the client system.

53. A system according to claim 52 wherein said server system further configured with a receiving component for receiving an inquiry to provide information from one of a plurality of users.

54. A system according to claim 52 wherein said server system further comprising a processing component for searching and processing received inquiries against the data storage device containing variety of information collected by the collection component.

55. A system according to claim 52 wherein said server system further comprising a retrieving component to retrieve information from the data storage device.

56. A system according to claim 52 wherein said server system further comprising an information fulfillment component that downloads the requested information after retrieving from the data storage device to the plurality of users in the order in which the requests were received by the receiving component.

57. A system according to claim 47 wherein said server system further comprising a means for providing access only to authorized individuals.

58. A system according to claim 47 wherein said server system further comprising a means for storing and updating information into the database.

59. A system according to claim 58 wherein said server system further comprising a means for storing and updating at least one of a last name of an employee, a first name of the employee, a middle initial of the employee, a status of the employee, a building and room code where the employee is located, a work phone number, a user identification, an e-mail address, a facsimile number, a manager's name who has direct supervisory authority over the employee, a department name and code of the department, a payroll number, a social security number, and a pay cycle category such as weekly, biweekly and monthly.

60. A system according to claim 58 wherein said server system further comprising a means for storing and updating at least one of a software title, a software serial number, a software manufacturer, a brief description of the software, a date on which software was acquired, restrictions or limitations on software use, employees on whose desktop the software was installed, purchase order details relating to the software verifying the proof of purchase, any comments on software functionality, and other pertinent details useful to prove legal ownership and use of the software.

61. A system according to claim 58 wherein said server system further comprising a means for storing and updating at least one of a serial number for hardware, a name of an employee whom the specific hardware has been assigned to and the date on which assigned, details on the hardware such as a manufacturer's name, an address, warranty information, hardware capabilities including specifications, month and a year of acquisition, hardware classification such as a desktop unit or a laptop unit, any lease related information, if applicable, and other pertinent details useful to prove legal ownership and use of the hardware.

62. A system according to claim 58 wherein said server system further comprising a means for storing and updating at least one of a software title, a software serial number, a software manufacturer, a brief description of the software, a date on which software was licensed, restrictions or limitations on software use, employees on whose desktop the software was installed, contract details relating to the software licensing verifying the license, any comments on software functionality, and other pertinent details useful to prove valid licensing and use of the software.

63. A system according to claim 58 wherein said server system further comprising a means for storing and updating at least one of a department title, a manager's name, a manager's social security number, a manager's mail stop code, a telephone number and an extension, a business unit contact person's name, a telephone number, mail code, address, facsimile number and other relevant information of the contact person.

64. A system according to claim 58 wherein said server system further comprising a means for storing and updating at least one of a vendor name, a vendor's business address including a city, state and zip code, vendor status such as preferred or non preferred, quality rating of the vendor, customer service rating of the vendor, contact person's name for the vendor, terms on which the vendor expects to get paid, and any other vendor relationship details regarding the vendor.

65. A system according to claim 58 wherein said server system further comprising a means for storing and updating at least one of general training materials available for each of the software purchased and licensed and instructions on how to obtain such training materials.

66. A system according to claim 58 wherein said server system further comprising a means for storing and updating at least one of self assessment responses against a set of specific questions, responses of independent audit against a set of specific questions, any self assessment comments, comments by an audit committee, business unit's name, location, and a person completing self assessment, and compliance information relating to the software management process.

67. A system according to claim 58 wherein said server system further comprising a means for defining business requirements to be addressed by the at least one software asset.

68. A system according to claim 58 wherein said server system further comprising a means for analyzing information technology requirements.

69. A system according to claim 58 wherein said server system further comprising a means for analyzing environmental standards.

70. A system according to claim 58 wherein said server system further comprising a means for reviewing and finalizing business solution requirements.

71. A system according to claim 58 wherein said server system further comprising a means for identifying software alternatives that meet business requirements.

72. A system according to claim 47 wherein said server system further comprising a means for initiating and completing an acquisition process including prompting a user to decide to at least one of using an existing software, buying a new software, and building a new software to satisfy the business requirement.

73. A system according to claim 72 wherein said server system further comprising a means for evaluating and checking for existing software contracts.

74. A system according to claim 72 wherein said server system further comprising:

means for recommending whether to at least one of use an existing software, buy a new software, and build a new software; and means for implementing implement the recommendation to at least one of use an existing software, buy a new software, and build a new software.

75. A system according to claim 72 wherein said server system further comprising:

means for reviewing results of the user's decision;

means for preparing and submitting at least one of a request for proposal and a request for information to prospective vendors; and means for selecting a vendor to acquire the software.

76. A system according to claim 75 wherein said server system further comprising a means for recommending at least one of copying an existing software and purchasing additional licenses for the existing software.

77. A system according to claim 75 wherein said server system further comprising a means for analyzing the user's decision based on subjective and objective criteria.

78. A system according to claim 75 wherein said server system further comprising a means for rejecting the user's decision based on subjective and objective criteria.

79. A system according to claim 75 wherein said server system further comprising a means for entering the decision into the database.

80. A system according to claim 75 wherein said server system further comprising a means for facilitating compliance with equity investment guidelines, contract terms and conditions and other legal and financial requirements prior to the acquisition of the software.

81. A system according to claim 75 wherein said server system further comprising a means for generating at least one of a purchase order and a contract to acquire the software.

82. A system according to claim 81 wherein said server system further comprising a means for tracking software licenses.

83. A system according to claim 81 wherein said server system further comprising a means for updating the database.

84. A system according to claim 47 wherein said server system comprising a means for analyzing maintenance terms of a software contract for maintaining the software asset.

85. A system according to claim 84 wherein said server system further comprising a means for purchasing upgrades for the software contract.

86. A system according to claim 84 wherein said server system further comprising a means for maintaining software.

87. A system according to claim 84 wherein said server system further comprising a means for deploying an upgraded version of the software.

88. A system according to claim 84 wherein said server system further comprising a means for updating software purchase related information into the database.

89. A system according to claim 84 wherein said server system further comprising a means for updating software license related information into the database.

90. A system according to claim 84 wherein said server system further comprising a means for renewing a maintenance contract for a software asset.

91. A system according to claim 47 wherein said server system comprising a means for prompting a user to retire a software asset including de-installing and destroying the software in accordance with a corresponding software license, and updating the database with revised licensing information.

92. A system according to claim 91 wherein said server system further comprising a means for updating the server system with the purchasing information.

93. A system according to claim 47 wherein said server system further comprising a means for evaluating and assessing exposure of a department within the business entity.

94. A system according to claim 93 wherein said server system further comprising a means for computing a sigma value.

95. A system according to claim 93 wherein said server system further configured to compare comprising a means for comparing sigma values computed for each department within the business entity.

96. A system according to claim 47 wherein said server system further comprising a means for providing auditing functions.

97. A system according to claim 96 wherein said server system further comprising a means for developing and implementing corrective actions to improve the performance of the department.

98. A system according to claim 96 wherein said server system further comprising a means for entering information at least through one of a device connected to the client system.

99. A system according to claim 47 wherein said server system further comprising a means for providing information in response to an inquiry.

100. A system according to claim 99 wherein said server system further comprising:
    means for downloading requested information from a server system; and
    means for displaying requested information on a client system in response to the inquiry.

101. A system according to claim 100 wherein said server system further comprising a means for displaying an HTML document downloaded by the server system.

102. A system according to claim 99 wherein said server system further comprising a means for printing requested information in a pre-determined format.

103. A system according to claim 99 wherein said server system further comprising a means for accepting an inquiry from a user.

104. A system according to claim 103 wherein said server system further comprising:
    means for displaying information on to the client system; and
    means for receiving an inquiry from the client system.

105. A system according to claim 104 wherein said server system further comprising a means for submitting a request through pull down menus.

106. A system according to claim 104 wherein said server system further comprising a means for displaying an HTML document downloaded by the server system.

107. A system according to claim 104 wherein said server system further comprising a means for displaying at least one alternative out of various alternatives available to the user.

108. A system according to claim 104 wherein said server system further comprising:
    means for accessing the centralized database;
    means for searching the database regarding the specific inquiry;
    means for retrieving information from the database; and
    means for causing the retrieved information to be displayed on the client system.

109. A system according to claim 104 wherein said server system further comprising submitting a request through pull down menus.

110. A software license management system to automate a software management process for managing software assets of a business entity, measuring compliance requirements, and tracking/reporting status as necessary to assure proficiency and adherence to implementation requirements of the software management process, said system comprising:
    a client system,
    a centralized database for storing information, and
    a server system configured to be coupled to said client system and said centralized database, said management system further comprising:
    means for organizing and processing information using at least one of a software identification module, an acquisition module, a deployment module, a maintenance module and a software retirement module;
    means for displaying an assessment worksheet on the client system;
    means for displaying in the assessment worksheet at least two questions including whether complete software license documentation has been maintained at the user's location, and whether a reconciliation of installed software and licenses has been conducted by the user;
    means for inputting a response by the user to the at least two questions presented in the assessment worksheet;
    means for computing a sigma value based on the user's responses to the at least two questions to measure compliance with the software management process including compliance with software licenses associated with the software asset; and
    means for providing feedback and suggestions based on the computed sigma value to help reduce the exposure to litigation and penalties, maximize software asset utilization through tighter inventory control, and capitalize on the software procurement process.

111. A system for tracking software assets owned and licensed by a business entity, the business entity having a software management process, said system comprising:
    a client system;
    a centralized database for storing information, and
    a server system configured to be coupled to said client system and said centralized database, said system further comprising:
    means for accessing the centralized database containing software assets information including data relating to each software asset owned or licensed by the business entity including terms and conditions of each corresponding software license;
    means for searching the database regarding a specific inquiry received from a user;
    means for retrieving information from the database;
    means for causing the retrieved information to be displayed for tracking, monitoring and auditing purposes; and
    means for auditing each software asset owned or licensed by the business entity by:
        transmitting data for a selected software asset from the server to the client system to display an assessment worksheet;
        displaying in the assessment worksheet at least two questions including whether complete software license documentation has been maintained at the user's location, and whether a reconciliation of installed software and licenses has been conducted by the user;

inputting a response by the user to the at least two questions presented in the assessment worksheet;

inputting to the server the response received from the user to the at least two questions presented in the assessment worksheet; and determining compliance with the software management process including compliance with the terms and conditions of the software license corresponding to the acquired software asset by:

calculating at the server a sigma value based at least in part on the response inputted by the user.

112. A system for tracking software assets owned and licensed by a business entity, the business entity having a software management process, said system comprising:

a client system, a centralized database for storing information, and a server system configured to be coupled to said client system and said centralized database, said system further comprising:

means for displaying on the client system for a user a software management assessment checklist;

means for displaying in the assessment checklist at least two questions including whether complete software license documentation has been maintained at the user's location, and whether a reconciliation of installed software and licenses has been conducted by the user;

means for inputting a response by the user to the at least two questions presented in the assessment checklist; and means for determining compliance with the software management process including compliance with the terms and conditions of the software license corresponding to the acquired software asset by:

computing a sigma value based on guidelines pre-stored within the database and the response inputted by the user.

113. A system for tracking software assets owned and licensed by a business entity, the business entity having a software management process, said system comprising:

a client system, a centralized database for storing information, and a server system configured to be coupled to said client system and said centralized database, said system further comprising:

means for storing in the database information relating to a software asset owned or licensed by the business entity including storing terms and conditions of a corresponding software license;

means for displaying on the client system an assessment worksheet;

means for displaying in the assessment worksheet at least two questions including whether complete software license documentation has been maintained at the user's location, and whether a reconciliation of installed software and licenses has been conducted by the user;

means for inputting a response by the user to the at least two questions presented in the assessment worksheet;

means for determining compliance with the software management process including compliance with the terms and conditions of the software license corresponding to the acquired software asset by:

analyzing user input against a pre-determined criteria; and calculating a sigma value based on the user input and the pre-determined criteria.

\* \* \* \* \*

UNITED STATES PATENT AND TRADEMARK OFFICE
CERTIFICATE OF CORRECTION

| | | |
|---|---|---|
| PATENT NO. | : 7,197,466 B1 | Page 1 of 1 |
| APPLICATION NO. | : 09/705110 | |
| DATED | : March 27, 2007 | |
| INVENTOR(S) | : Peterson et al. | |

It is certified that error appears in the above-identified patent and that said Letters Patent is hereby corrected as shown below:

In Claim 44, column 18, line 2, delete "least one question displayed two questions" and insert therefor --least two questions--.

In Claim 74, column 22, line 1, delete "implementing implement the recommendation" and insert therefor --implementing the recommendation--.

In Claim 95, column 23, line 12, delete "further configured to compare comprising" and insert therefor --further comprising--.

Signed and Sealed this

Twenty-eighth Day of April, 2009

JOHN DOLL
*Acting Director of the United States Patent and Trademark Office*